US012089153B2

(12) United States Patent
Uppala et al.

(10) Patent No.: US 12,089,153 B2
(45) Date of Patent: Sep. 10, 2024

(54) TARGET WAKE TIME (TWT) RENEGOTIATION

(71) Applicant: QUALCOMM Incorporated, San Diego, CA (US)

(72) Inventors: Srinivasa Rao Uppala, Hyderabad (IN); Sriman Miryala, Hyderabad (IN); Hemant Gupta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 17/711,954

(22) Filed: Apr. 1, 2022

(65) Prior Publication Data

US 2023/0319711 A1  Oct. 5, 2023

(51) Int. Cl.
*H04W 52/02* (2009.01)
(52) U.S. Cl.
CPC ... *H04W 52/0216* (2013.01); *H04W 52/0229* (2013.01)
(58) Field of Classification Search
CPC ......... H04W 52/0216; H04W 52/0229; H04W 76/28; H04W 84/18; H04W 84/12; H04W 4/80; Y02D 30/70
See application file for complete search history.

(56) References Cited

U.S. PATENT DOCUMENTS

| 2013/0308685 | A1  | 11/2013 | Nagai |
| 2016/0192114 | A1* | 6/2016  | Sole ........................ H04L 65/65 455/41.3 |
| 2019/0045438 | A1* | 2/2019  | Cariou .............. H04W 52/0219 |
| 2019/0297373 | A1* | 9/2019  | Nakajima ........ H04N 21/47217 |
| 2021/0037464 | A1  | 2/2021  | Cariou et al. |

OTHER PUBLICATIONS

International Search Report and Written Opinion—PCT/US2023/015648—ISA/EPO—Jun. 12, 2023.

* cited by examiner

*Primary Examiner* — Marcos L Torres
(74) *Attorney, Agent, or Firm* — Holland & Hart LLP

(57) ABSTRACT

This disclosure describes techniques for renegotiating target wake time (TWT) parameters used for transmitting Bluetooth-encoded audio frames over one or more Wi-Fi channels. In some implementations, a software-enabled access point (softAP) paired with a peripheral device based on a Bluetooth protocol and associated with the peripheral device via a WLAN link transmits one or more first Bluetooth-encoded audio frames indicating a current time-to-play (TTP) value for audio data to the peripheral device over the WLAN link during a first TWT session. The softAP detects a change in the WLAN link, and obtains new TWT parameters and a new TTP value responsive to the detected change. The softAP indicates the new TWT parameters and the new TTP value to the peripheral device in conjunction with tearing down the first TWT session, and establishes a second TWT session with the peripheral device based at least in part on the new TWT parameters.

30 Claims, 15 Drawing Sheets

TARGET WAKE TIME (TWT) RENEGOTIATION

TECHNICAL FIELD

This disclosure relates generally to wireless communications, and more specifically, to renegotiating target wake time (TWT) parameters used for transmitting Bluetooth-encoded audio frames over one or more Wi-Fi channels.

DESCRIPTION OF THE RELATED TECHNOLOGY

A wireless personal area network (WPAN) is a short-range wireless network typically established by a user to interconnect various personal devices, sensors, and/or appliances located within a certain distance or area of the user. For example, WPANs based on communication protocols such as a Bluetooth® (BT) protocol, a Bluetooth® Low Energy protocol, or a Zigbee® protocol may provide wireless connectivity to peripheral devices within a specific distance (such as 5 meters, 10 meter, 20 meters, 100 meters, etc.) of the user.

Bluetooth is a short-range wireless communication protocol that supports a WPAN between a central device (such as a host device) and at least one peripheral device (such as a client device). Power consumption associated with Bluetooth communications may render Bluetooth impractical in certain applications.

To address the power consumption issue associated with Bluetooth, Bluetooth® Low Energy (BLE) was developed and adopted in various applications in which data transfers occur relatively infrequently. Specifically, BLE exploits the infrequent transfer of data by using a low duty cycle operation, and placing one or both the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE enabled smart phones, tablets, and laptops. While traditional Bluetooth and BLE offer certain advantages, there exists a need for further improvements in Bluetooth and BLE technology. For example, traditional Bluetooth and BLE have limited range, have limited data capacity throughput, and are susceptible to interference from other devices communicating in the same frequency band (such as Wi-Fi communications).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description presented later.

One innovative aspect of the subject matter described in this disclosure can be implemented as a method for wireless communication by a wireless device. In some implementations, the method includes operating the wireless device as a wireless station (STA) associated with a wireless local area network (WLAN) while also operating as a software-enabled access point (softAP) paired with a peripheral device based on a Bluetooth protocol, the peripheral device associated with the softAP via a WLAN link. The method includes transmitting one or more first Bluetooth-encoded audio frames to the peripheral device over the WLAN link during a first target wake time (TWT) session on the WLAN link, the one or more first Bluetooth-encoded audio frames indicating a current time-to-play (TTP) value for audio data. The method includes detecting a change in the WLAN link, and obtaining one or more new TWT parameters and a new TTP value responsive to detecting the change in the WLAN link, the new TTP value being greater than the current TTP value. The method includes indicating the one or more new TWT parameters and the new TTP value to the peripheral device in conjunction with tearing down the first TWT session, and establishing a second TWT session on the WLAN link with the peripheral device based at least in part on the one or more new TWT parameters. In some aspects, the peripheral device may include a first earbud and a second earbud, each of the first earbud and the second earbud being associated with the softAP, and each of the first earbud and the second earbud being paired with the softAP via the Bluetooth connection.

In various implementations, the detected change in the WLAN link may include one or more of a degradation of channel conditions on the WLAN link, a decrease in a channel quality indicator (QCI) of the WLAN link, a decrease in a modulation and coding scheme (MCS) associated with transmitting Bluetooth-encoded audio frames over the WLAN link, an increase in a packet error rate (PER) associated with the WLAN link, an increase in latencies associated with transmission of the Bluetooth-encoded audio frames over the WLAN link, or an increase in a number of retransmission attempts of one or more Bluetooth-encoded audio frames over the WLAN link. In some instances, a time period between a first time indicated by the current TTP value and a second time indicated by the new TTP value may be based at least in part on a duration of time associated with establishing the second TWT session. In some aspects, the time period may be approximately 250 milliseconds.

In some instances, the WLAN link includes one or more wireless channels in a 2.4 GHz frequency band, a 5 GHz frequency band, or a 6 GHz frequency band. In other instances, the WLAN link includes at least one of a peer-to-peer (P2P) link, a tunneled direct-link setup (TDLS) link, a Wi-Fi Direct link, a link associated with a Group Owner (GO), or a link associated with a Neighborhood Area Network (NAN).

The method may also include transmitting one or more second Bluetooth-encoded audio frames to the peripheral device over the WLAN link during the second TWT session, the one or more second Bluetooth-encoded audio frames carrying the new TTP value. In some instances, the new TTP value is based at least in part on a size of a buffer associated with buffering the one or more second Bluetooth-encoded audio frames in the peripheral device.

In various implementations, indicating the new TWT parameters to the peripheral device may include sending a Bluetooth protocol message to the peripheral device over a Bluetooth connection established between the wireless device and the peripheral device, the Bluetooth protocol message carrying the one or more new TWT parameters to the peripheral device. In some instances, the one or more new TWT parameters may include at least one of a TWT wake duration, a TWT wake interval, a TWT wake time, a minimum data rate, a mean data rate, a delay bound, or a user priority (UP) for the TWT session.

In some implementations, indicating the new TTP value to the peripheral device may include embedding the new TTP value into at least one Bluetooth-encoded audio frame transmitted to the peripheral device over the WLAN link after detecting the change in the WLAN link. In other implementations, indicating the new TTP value to the peripheral device may include pausing transmission of the audio data for a period of time responsive to detecting the change in the WLAN link, and transmitting one or more additional Bluetooth-encoded audio frames to the peripheral device over the WLAN link after expiration of the period of time, at least one of the additional Bluetooth-encoded audio frames carrying the new TTP value. In other some implementations, indicating the new TTP value to the peripheral device may include sending a Bluetooth protocol message to the peripheral device over the Bluetooth connection responsive to the detected change in the WLAN link, the Bluetooth protocol message carrying the new TTP value for the audio data.

Another innovative aspect of the subject matter described in this disclosure can be implemented in a wireless device. In some implementations, the wireless device may include one or more processors and a memory coupled to the one or more processors. In some implementations, the memory stores processor-readable code that, when executed by the one or more processors, is configured to operate the wireless device as a STA associated with a WLAN while also operating as a softAP paired with a peripheral device based on a Bluetooth protocol, the peripheral device associated with the softAP via a WLAN link. Execution of the processor-readable code may be configured to transmit one or more first Bluetooth-encoded audio frames to the peripheral device over the WLAN link during a first TWT session on the WLAN link, the one or more first Bluetooth-encoded audio frames indicating a current TTP value for audio data. Execution of the processor-readable code may be configured to detect a change in the WLAN link, and to obtain one or more new TWT parameters and a new TTP value responsive to detecting the change in the WLAN link, the new TTP value being greater than the current TTP value. Execution of the processor-readable code may be configured to indicate the one or more new TWT parameters and the new TTP value to the peripheral device in conjunction with tearing down the first TWT session, and to establish a second TWT session on the WLAN link with the peripheral device based at least in part on the one or more new TWT parameters. In some aspects, the peripheral device may include a first earbud and a second earbud, each of the first earbud and the second earbud being associated with the softAP, and each of the first earbud and the second earbud being paired with the softAP via the Bluetooth connection.

In various implementations, the detected change in the WLAN link may include one or more of a degradation of channel conditions on the WLAN link, a decrease in a CQI of the WLAN link, a decrease in an MCS associated with transmitting Bluetooth-encoded audio frames over the WLAN link, an increase in a PER associated with the WLAN link, an increase in latencies associated with transmission of the Bluetooth-encoded audio frames over the WLAN link, or an increase in a number of retransmission attempts of one or more Bluetooth-encoded audio frames over the WLAN link. In some instances, a time period between a first time indicated by the current TTP value and a second time indicated by the new TTP value may be based at least in part on a duration of time associated with establishing the second TWT session. In some aspects, the time period may be approximately 250 milliseconds.

In some instances, the WLAN link includes one or more wireless channels in a 2.4 GHz frequency band, a 5 GHz frequency band, or a 6 GHz frequency band. In other instances, the WLAN link includes at least one of a P2P link, a TDLS link, a Wi-Fi Direct link, a link associated with a GO, or a link associated with a NAN.

Execution of the processor-readable code may be configured to transmit one or more second Bluetooth-encoded audio frames to the peripheral device over the WLAN link during the second TWT session, the one or more second Bluetooth-encoded audio frames carrying the new TTP value. In some instances, the new TTP value may be based at least in part on a size of a buffer associated with buffering the one or more second Bluetooth-encoded audio frames in the peripheral device.

In various implementations, execution of the processor-readable code to indicate the new TWT parameters to the peripheral device may be configured to send a Bluetooth protocol message to the peripheral device over a Bluetooth connection established between the wireless device and the peripheral device, the Bluetooth protocol message carrying the one or more new TWT parameters to the peripheral device. In some instances, the one or more new TWT parameters may include at least one of a TWT wake duration, a TWT wake interval, a TWT wake time, a minimum data rate, a mean data rate, a delay bound, or a user priority (UP) for the TWT session.

In some implementations, execution of the processor-readable code to indicate the new TTP value to the peripheral device may be configured to embed the new TTP value into at least one Bluetooth-encoded audio frame transmitted to the peripheral device over the WLAN link after detecting the change in the WLAN link. In other implementations, execution of the processor-readable code to indicate the new TTP value to the peripheral device may be configured to pause transmission of the audio data for a period of time responsive to detecting the change in the WLAN link, and to transmit one or more additional Bluetooth-encoded audio frames to the peripheral device over the WLAN link after expiration of the period of time, at least one of the additional Bluetooth-encoded audio frames carrying the new TTP value. In other some implementations, execution of the processor-readable code to indicate the new TTP value to the peripheral device may be configured to send a Bluetooth protocol message to the peripheral device over the Bluetooth connection responsive to the detected change in the WLAN link, the Bluetooth protocol message carrying the new TTP value for the audio data.

Details of one or more implementations of the subject matter described in this disclosure are set forth in the accompanying drawings and the description herein. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
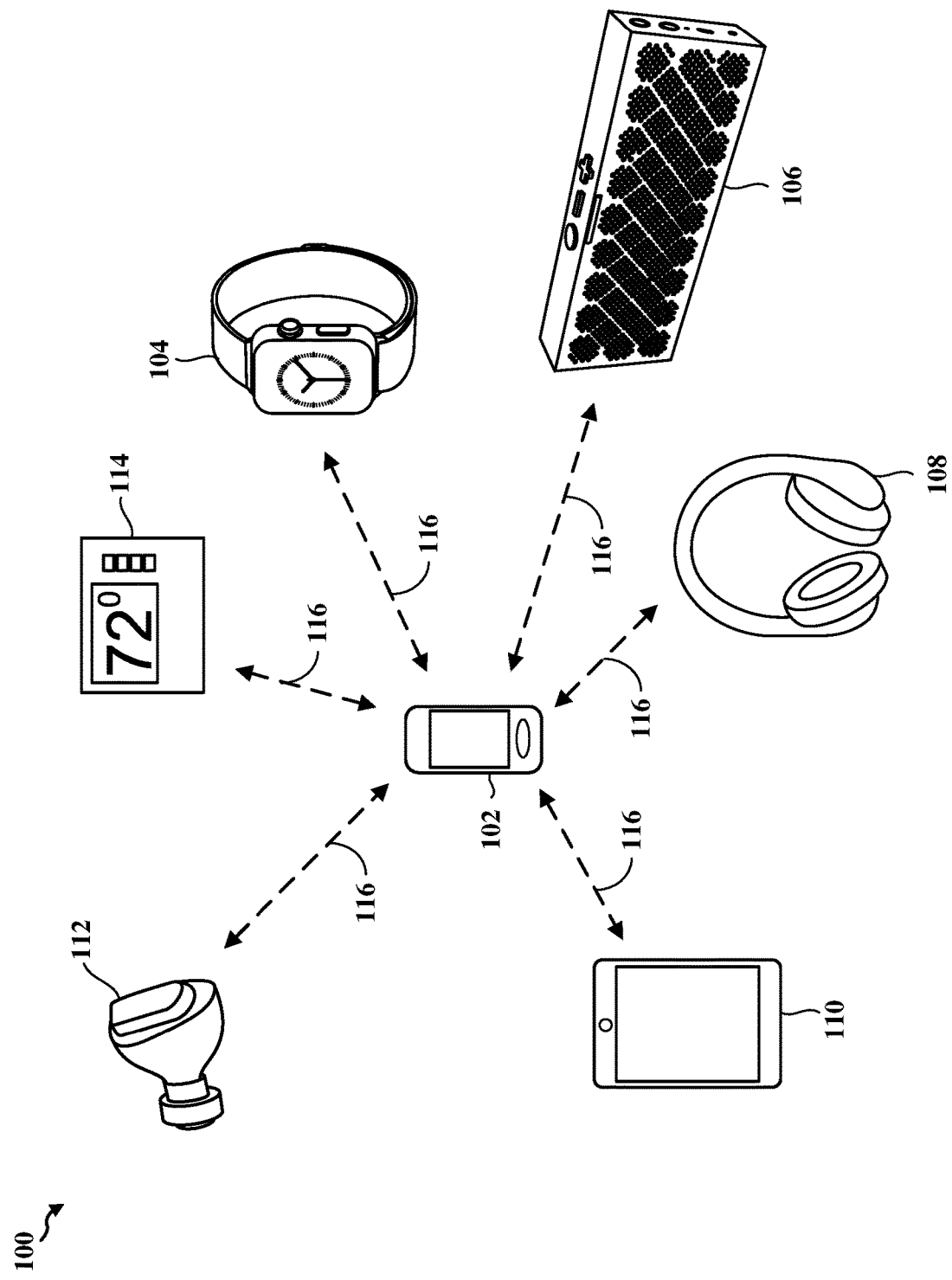
FIG. 1 shows a pictorial diagram of an example Wireless Personal Area Network (WPAN), according to various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Communications based on traditional Bluetooth and BLE suffer from several limitations that can limit user experiences and negatively affect user experiences. For example, the range of traditional Bluetooth and BLE is limited by a single hop radio frequency (RF) transmission. Additionally, traditional Bluetooth and BLE have limited data capacity, which can have several negative effects on user experience. For example, the limited data capacity of traditional Bluetooth and BLE can result in limited audio quality or a quality level unacceptable to the user. Further, traditional Bluetooth and BLE are enabled for radio frequency communication operating within the globally accepted 2.4 GHz Industrial, Scientific & Medical (ISM) frequency band. However, Bluetooth and BLE devices that operate only within the 2.4 GHz frequency band may be subject to interference from other devices communicating with each other in the 2.4 GHz frequency band (such as Wi-Fi devices).

To address these limitations, wireless devices may be configured to operate using a Bluetooth (BT) over Internet Protocol (BToIP) that allows Bluetooth and BLE data to be communicated over wireless networks that are based on, or that are at least compatible with, Internet Protocol (IP) packets and Transmission Control Protocol/IP (TCP/IP) packets. For example, wireless devices configured in accordance with the present disclosure can transmit and receive Bluetooth and BLE data over one or more channels associated with a wireless local area network (WLAN) by encapsulating the Bluetooth or BLE data within frames or packets formatted according to the IEEE 802.11 family of wireless communication standards. In this way, the wireless devices can communicate with one another in not only the 2.4 GHz frequency band, but also in the 5 GHz, the 6 GHz frequency band, and other suitable frequency bands.

In some other implementations, wireless devices may be configured to operate using a Bluetooth (BT) over WLAN (BToWLAN) protocol that allows WLAN-compliant data packets (such as IEEE 802.11-compliant PPDUs) to include encapsulated Ethernet frames carrying encoded audio data intended for one or more associated Bluetooth-enabled peripheral devices. The Ethernet frames may be of a new Ethertype indicating that the Ethernet frames carry audio data intended for one or more Bluetooth peripheral devices. The new Ethertype may also signal that the Ethernet frames are non IP-based Ethernet frames that do not need to pass through a TCP/IP stack prior to transmission to the one or more Bluetooth peripheral devices, thereby avoiding latencies associated with the TCP/IP stack.

In some implementations, wireless devices described herein may transmit Bluetooth-encoded audio frames to a peripheral device over a WLAN link using the TWT operation described in the IEEE 802.11 family of wireless communication standards. For example, the 802.11ax amendment to the IEEE 802.11 standards describes a TWT operation that allows non-AP devices to manage activity in a WLAN by scheduling the non-AP devices to operate at different times to minimize medium contention and to reduce the required amount of time that a respective non-AP device utilizing a power management mode needs to be awake. The 802.11be amendment to the IEEE 802.11 standards describes a restricted TWT (r-TWT) service period (SP) that can be allocated for latency-sensitive traffic. For example, non-legacy devices that support r-TWT operation and acquire transmit opportunities (TXOPs) outside of an r-TWT SP must terminate their respective TXOPs before the start of any r-TWT SP for which they are not a member. Further, traffic from all legacy devices may be suppressed during an r-TWT SP by scheduling a quiet interval to overlap with the r-TWT SP. As such, r-TWT SPs can provide more predictable latency, reduced worst case latency, or reduced jitter, with higher reliability for latency-sensitive traffic.

When a wireless device transmits a data stream over a WLAN link during a TWT SP, the wireless device must comply with the TWT parameters that were negotiated during setup of the TWT SP. The values of at least some of the negotiated TWT parameters may be based on channel conditions or a channel quality of the WLAN link when the TWT SP was setup or scheduled. The channel conditions and channel quality of a WLAN link may change during transmission of a data stream over the WLAN link, particularly for wireless devices such as STAs and softAPs that can be moved or rotated during transmission of the data stream. These changes in channel conditions or channel quality of the WLAN link may render one or more of the negotiated TWT parameters inapplicable for transmitting a remaining portion of the data stream over the WLAN link. At present, there is no mechanism by which a wireless device belonging to a TWT SP can change or adjust the TWT parameters to compensate for changes in channel conditions or channel quality of the WLAN link.

Implementations of the subject matter described in this disclosure may be used to renegotiate one or more of the TWT parameters associated with a TWT operation based on changes in the WLAN link. In some implementations, a wireless device operating as a software-enabled access point (softAP) paired with a peripheral device over a Bluetooth connection and associated with the peripheral device via a WLAN link may transmit one or more first Bluetooth-encoded audio frames to the peripheral device over the WLAN link during a first TWT session. The one or more first Bluetooth-encoded audio frames may indicate a current time-to-play (TTP) value for a corresponding audio stream transmitted to the peripheral device. The wireless device may detect a change in the WLAN link, and may obtain one or more new TWT parameters and a new TTP value responsive to detecting the change in the WLAN link. The new TTP value may be based at least in part on a duration of time associated with the wireless device and the peripheral device establishing a new TWT session with one another on the WLAN link. In some aspects, the new TTP value may also be based on a size of, or available space in, a data buffer responsible for buffering received audio data in the peripheral device.

The wireless device may indicate the one or more new TWT parameters and the new TTP value to the peripheral device in conjunction with tearing down the first TWT session. In some aspects, the wireless device may send a Bluetooth protocol message carrying the one or more new TWT parameters to the peripheral device over the Bluetooth connection. In some instances, the wireless device may embed the new TTP value within one or more additional Bluetooth-encoded audio frames transmitted to the peripheral device during the first TWT session. In other instances, the wireless device may send a Bluetooth protocol message carrying the new TTP value to the peripheral device over the Bluetooth connection. The wireless device may establish a second TWT session with the peripheral device based at least in part on the one or more new TWT parameters. Thereafter, the wireless device may transmit, to the peripheral device over the WLAN link, one or more second Bluetooth-encoded audio frames carrying the new TTP value.

Particular implementations of the subject matter described in this disclosure can be implemented to realize one or more of the following potential advantages. By renegotiating one or more of the TWT parameters with the peripheral device when channel conditions or the channel quality of the WLAN link changes, the wireless device may dynamically adjust the TWT parameters used for TWT operation in a manner that compensates for changing channel conditions or channel quality of the WLAN link. Further, by obtaining a new TTP value based at least in part on the duration of time associated with establishing a new TWT session and indicating the new TTP value to the peripheral device, the wireless device may transmit Bluetooth-encoded audio frames to the peripheral device over the WLAN link during different TWT sessions without interrupting delivery of the audio stream to the peripheral device. In this way, aspects of the present disclosure may ensure that the peripheral device is able to play audio data extracted from Bluetooth-encoded audio frames received during different TWT sessions for the user without interruption or adversely impacting the user's experience.

FIG. 1 shows a pictorial diagram of an example Wireless Personal Area Network (WPAN) 100, according to some implementations. Within the WPAN 100, a central device 102 may connect to and establish a BLE communication link 116 with one or more peripheral devices 104, 106, 108, 110, 112, 114 using a BLE protocol or a modified BLE protocol. The BLE protocol is part of the BT core specification and enables radio frequency communication operating within the globally accepted 2.4 GHz Industrial, Scientific & Medical (ISM) band.

The central device 102 may include suitable logic, circuitry, interfaces, processors, and/or code that may be used to communicate with one or more peripheral devices 104, 106, 108, 110, 112, or 114 using the BLE protocol or the modified BLE protocol as described herein. The central device 102 may operate as an initiator to request establishment of a link layer (LL) connection with an intended peripheral device 104, 106, 108, 110, 112, or 114. A Link Manager may be used to control operations between a BToIP application controller in the central device 102 and a BToIP application controller in each of the intended peripheral devices 104, 106, 108, 110, 112, and/or 114.

After a requested link layer connection is established, the central device 102 may become a host device, and the selected or intended peripheral device 104, 106, 108, 110, 112, or 114 may become paired with the central device 102 over the established link layer connection. As a host device, the central device 102 may be capable of supporting multiple link layer connections at a time with various peripheral devices 104, 106, 108, 110, 112, or 114 operating as client devices. Specifically, the central device 102 may manage various aspects of data packet communication in a link layer connection with one or more of the associated peripheral devices 104, 106, 108, 110, 112, or 114. For example, the central device 102 may determine an operation schedule in the link layer connection with one or more peripheral devices 104, 106, 108, 110, 112, or 114. The central device 102 may also initiate a link layer protocol data unit (PDU) exchange sequence over the link layer connection. Link layer connections may be configured to run periodic connection events in dedicated data channels. The exchange of link layer data PDU transmissions between the central device 102 and one or more of the peripheral devices 104, 106, 108, 110, 112, or 114 may take place within connection events.

In some implementations, the central device 102 may be configured to transmit the first link layer data PDU in each connection event to an intended peripheral device 104, 106, 108, 110, 112, or 114. In other implementations, the central device 102 may utilize a polling scheme to poll the intended peripheral device 104, 106, 108, 110, 112, or 114 for a link layer data PDU transmission during a connection event. The intended peripheral device 104, 106, 108, 110, 112, or 114 may transmit a link layer data PDU upon receipt of packet link layer data PDU from the central device 102. In some other implementations, a peripheral device 104, 106, 108, 110, 112, or 114 may transmit a link layer data PDU to the central device 102 without first receiving a link layer data PDU from the central device 102.

Examples of the central device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, or 114 may include a cellular phone, a smart phone, a SIP phone, a STA, a laptop, a PC, a desktop computer, a PDA, a satellite radio, a global positioning system, a multimedia device, a video device, a digital audio player, a camera, a game console, a tablet, a smart device, a wearable device (such as a smart watch, wireless headphones, etc.), a vehicle, an electric meter, a gas pump, a toaster, a thermostat, a hearing aid, a blood glucose on-body unit, an IoT device, or any other similarly functioning device. Although the central device 102 is illustrated in communication with six peripheral devices 104, 106, 108, 110, 112, or 114 in the WPAN 100, the central device 102 may communicate with more or fewer than six peripheral devices within the WPAN 100 without departing from the scope of the present disclosure.

A device implementing the BT protocol, such as the central device 102, may operate according to one radio mode, such as basic rate (BR)/enhanced data rate (EDR), and a device implementing the BLE protocol may operation according to a BLE radio mode. In some aspects, the central device 102 may be configured with dual radio modes, and therefore may be able to operate according to the BR/EDR mode or the BLE mode, for example, based on the type of short-rage wireless communication in which the device may engage.

For example, the central device 102 may operate according to the BR/EDR mode for continuous streaming of data, for broadcast networks, for mesh networks, and/or for some other applications in which a relatively higher data rate may be more suitable. However, the device may operate according to the BLE mode for short burst data transmissions, such as for some other applications in which power conservation may be desirable and/or a relatively lower data rate may be acceptable. In other aspects, the central device 102 may operate according to one or more other radio modes, including proprietary radio mode(s). Examples of other radio modes may include high speed radio modes, low energy radio modes, isochronous radio modes, etc.

Figure 2:
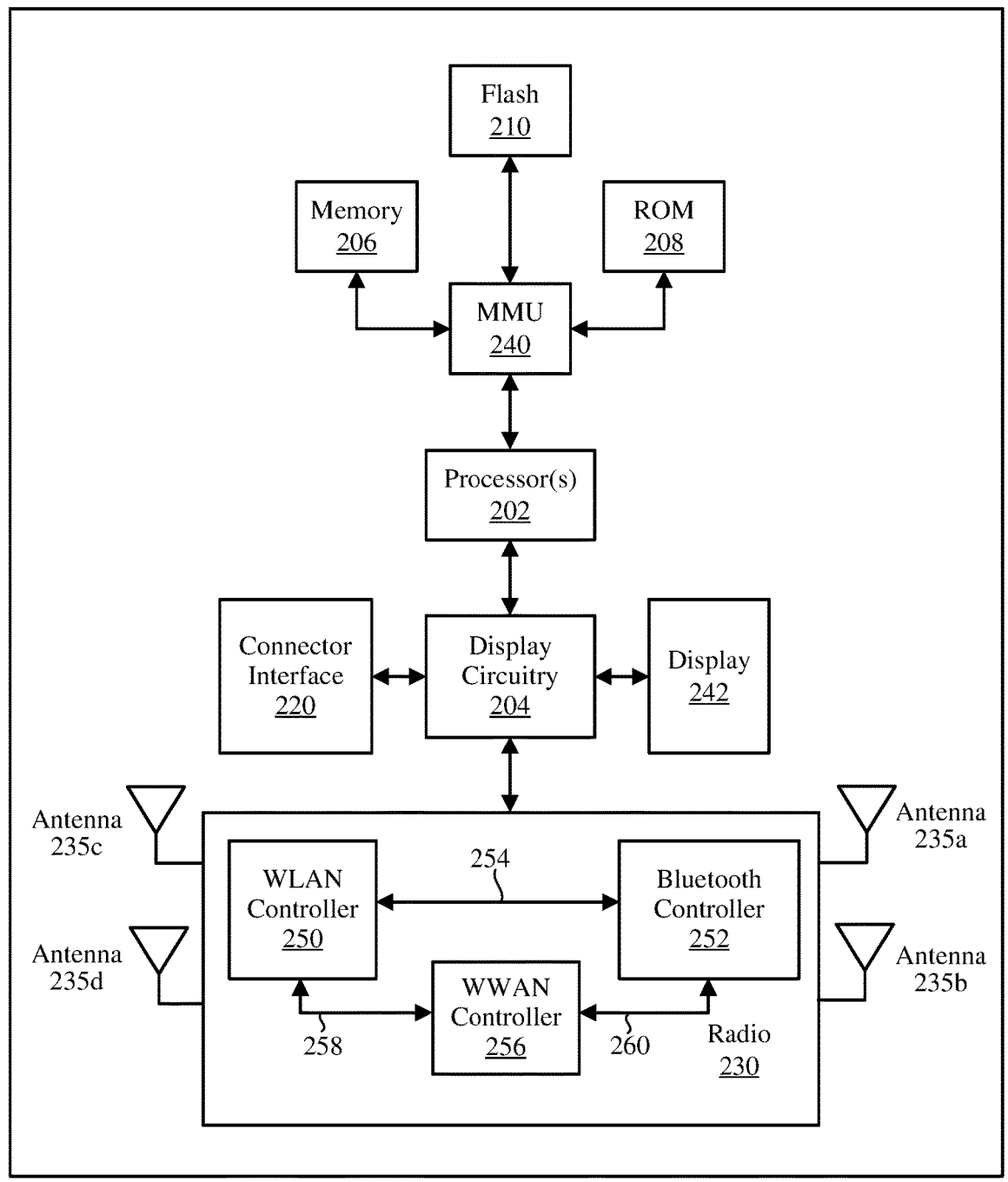
FIG. 2 shows a block diagram of a wireless device, according to various aspects of the present disclosure.

FIG. 2 shows a block diagram of a wireless device 200, according to some implementations. In some instances, the wireless device 200 may be an example of the central device 102 of FIG. 1. In other instances, the wireless device 200 may be an example of one or more of the peripheral devices 104, 106, 108, 110, 112, or 114 of FIG. 1. In some aspects, the wireless device 200 may be a Bluetooth-enabled device (such as a BLE device).

As shown, the wireless device 200 may include a processing element, such as processor(s) 202, which may execute program instructions for the wireless device 200. The wireless device 200 may also include display circuitry 204 that can perform graphics processing and present information to a user via the display 242. The processor(s) 202 may also be coupled to memory management unit (MMU) 240, which may be configured to receive addresses from the processor(s) 202 and translate the addresses to address locations in memory such as memory 206, ROM 208, or Flash memory 210) and/or to address locations in other circuits or devices, such as the display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless device 200. For example, the wireless device 200 may include various types of memory, a connector interface 220 through which the wireless device 200 can communicate with the computer system, and wireless communication subsystems that can transmit data to, and receive data from, other devices based on one or more wireless communication standards or protocols. For example, in some aspects, the wireless communication subsystems may include (but are not limited to) a WLAN subsystem, a Bluetooth subsystem, or a cellular subsystem (such as an LTE or 5G NR subsystem). The wireless device 200 may include a plurality of antennas 235a, 235b, 235c, or 235d for performing wireless communication with, for example, wireless devices in a WPAN.

The wireless device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an field programmable gate array (FPGA), and/or an application specific integrated circuit (ASIC).

In certain aspects, the radio 230 may include separate controllers configured to control communications for various respective radio access technology (RAT) protocols. For example, as shown in FIG. 2, radio 230 may include a WLAN controller 250 that manages WLAN communications, a Bluetooth controller 252 that manages Bluetooth and BLE, and a WWAN controller 256 that manages WWAN communications. In certain aspects, the wireless device 200 may store and execute a WLAN software driver for controlling WLAN operations performed by the WLAN controller 250, a Bluetooth software driver for controlling Bluetooth operations performed by the Bluetooth controller 252, and/or a WWAN software driver for controlling WWAN operations performed by the WWAN controller 256.

In certain implementations, a first coexistence interface 254 (such as a wired interface) may be used for sending information between the WLAN controller 250 and the Bluetooth controller 252. In certain other implementations, a second coexistence interface 258 may be used for sending information between the WLAN controller 250 and the WWAN controller 256. In certain other implementations, a third coexistence interface 260 may be used for sending information between the Bluetooth controller 252 and the WWAN controller 256.

In some aspects, one or more of the WLAN controller 250, the Bluetooth controller 252, and/or the WWAN controller 256 may be implemented as hardware, software, firmware or some combination thereof.

In certain configurations, the WLAN controller 250 may be configured to communicate with a second device in a WPAN using a WLAN link using all of the antennas 235a, 235b, 235c, and 235d. In certain other configurations, the Bluetooth controller 252 may be configured to communicate with at least one second device in a WPAN using one or more of the antennas 235a, 235b, 235c, and 235d. In certain other configurations, the WWAN controller 256 may be configured to communicate with a second device in a WPAN using all of the antennas 235a, 235b, 235c, and 235d. The WLAN controller 250, the Bluetooth controller 252, and/or the WWAN controller 256 may be configured to adjust wakeup time interval and shutdown time for the device.

Figure 3:
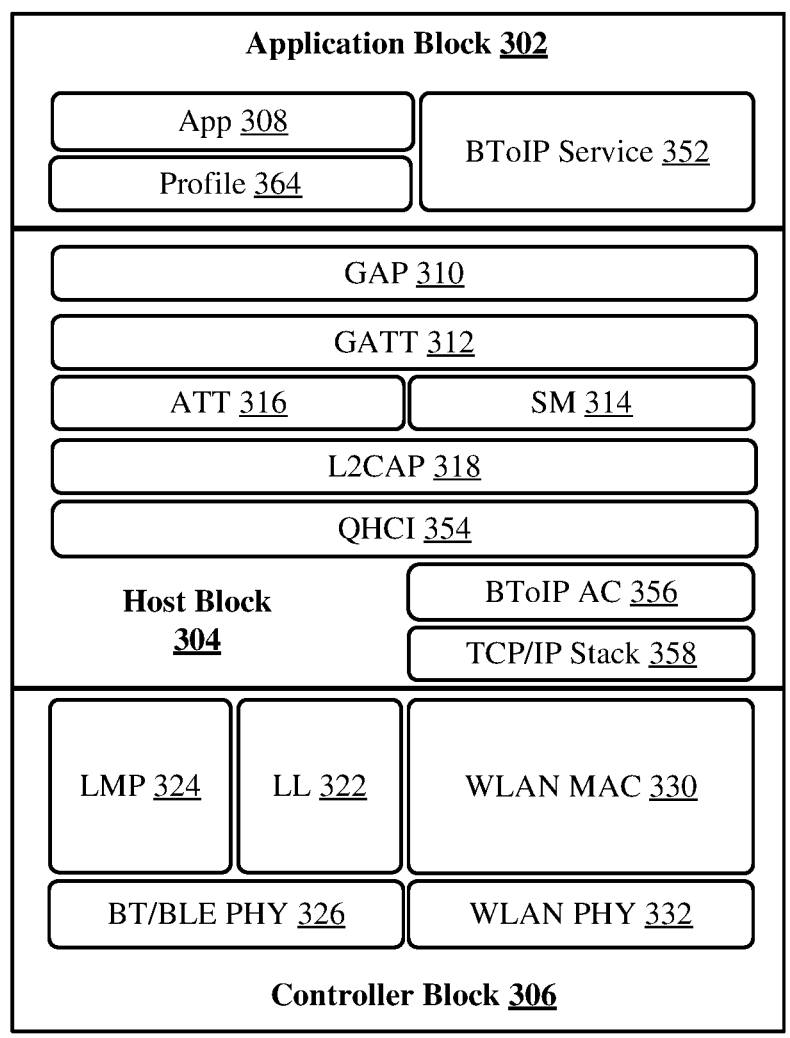
FIG. 3 shows a block diagram of a Bluetooth over Internet Protocol (BToIP) protocol stack, according to various aspects of the present disclosure.

FIG. 3 shows a block diagram of a BToIP protocol stack 300, according to some implementations. The BToIP protocol stack 300 may be implemented by one or more of processor(s) 202, memory 206, Flash memory 210, ROM 208, the radio 230, and/or the Bluetooth controller 252 described with reference to FIG. 2. In some implementations, the BToIP protocol stack 300 may be organized into three blocks, namely, the Application block 302, the Host block 304, and the Controller block 306. The Application block 302 may be a user application that interfaces with the other blocks and/or layers of the BToIP protocol stack 300. In some aspects, the Application block 302 may include one or more applications and one or more Bluetooth profiles that allow the applications to use the Bluetooth (BT) and BLE communications. The Host block 304 may include the upper layers of the BToIP protocol stack 300, and the Controller block 306 may include the lower layers of the BToIP protocol stack 300. The Host block 304 may communicate with a controller (such as the Bluetooth controller 252 of FIG. 2) in a wireless device using a Host Controller Interface (HCI) such as QHCI 354. The QHCI 354 may also be used as an interface between the Controller block 306 and the Host block 304 that allows a wide range of Hosts to interface with the Controller block 306. In some aspects, the Controller block 306 may be used for hardware interface management, link establishment, and link management.

The Application block 302 may include a higher-level Application Layer (App) 308, a Profile Layer (Profile) 364, and a BToIP Service layer 352. The Host block 304 may include a Generic Access Profile (GAP) 310, a Generic Attribute Protocol (GATT) 312, a Security Manager (SM) 314, an Attribute Protocol (ATT) 316, a Logical Link Control and Adaptation Protocol (L2CAP) 318, and the QHCI 354. In some aspects, the Host block 304 may also include a BToIP Application Controller (BToIP AC) 356 and a TCP/IP stack 358. The Controller block 306 may include a Link Layer (LL) 322, a Link Manager Protocol (LMP) 324, a BT/BLE Physical Layer (PHY) 326, a WLAN MAC 330, and a WLAN Physical Layer (WLAN PHY) 332.

To support IoT applications, audio applications, and other applications, the BT/BLE PHY 326 may be configured to support wider communication bandwidths and data rate than PHYs associated with conventional Bluetooth or BLE protocol stacks. For example, in some aspects, the BT/BLE PHY 326 may define the mechanism for transmitting a bit stream over a physical link that connects BLE devices. The bit stream may be grouped into code words or symbols, and converted to a PDU that is transmitted over a wireless medium. The BT/BLE PHY 326 may provide an electrical, mechanical, and procedural interface for the wireless medium. Specifically, the BT/BLE PHY 326 may specify the frequency band, the channel bandwidth, the modulation and coding scheme (MCS), the cyclic-shift diversity (CSD), and other physical aspects of wireless transmissions. The WLAN PHY 332 may define the mechanism for transmitting a bit stream over a physical WLAN link that connects two or more devices (such as WLAN devices). The BT/BLE PHY 326 and the WLAN PHY 330 may provide an electrical, mechanical, and procedural interface to the transmission medium. The shapes and properties of the electrical connectors, the frequency band used for transmission, the modulation scheme, and similar low-level parameters may be specified by the BT/BLE PHY 326 and WLAN PHY 330.

The LMP 324 may be responsible for low level communication over the BT/BLE PHY 326. The LMP 324 may manage the sequence and timing of transmitted and received link layer data PDUs, and using a link layer protocol, communicate with other devices regarding connection parameters and data flow control. In some aspects, the LMP 324 may provide gate keeping functionality to limit exposure and data exchange with other devices. In some implementations, the LMP 324 may maintain a list of allowed devices and ignore all requests for baseband PDU exchange from devices not on the list. The LMP 324 may use the QHCI 354 to communicate with upper layers of the BToIP protocol stack 300. In certain aspects, the LMP 324 may be used to generate a baseband PDU and/or an empty packet (such as an empty PDU) that may be transmitted using a LMP communication link established with another traditional BT device (such as a BR/EDR device) using the LMP 324.

The LL 322 may be responsible for low level communication over the BT/BLE PHY 326. The LL 322 may manage the sequence and timing of transmitted and received LL data PDUs, and using a LL protocol, communicate with other devices regarding connection parameters and data flow control. The LL 322 may provide gate keeping functionality to limit exposure and data exchange with other devices. If filtering is configured, the LL 322 may maintain a list of allowed devices and ignore all requests for data PDU exchange from devices not on the list. The LL 322 may use the QHCI 354 to communicate with upper layers of the BToIP protocol stack 300. In certain aspects, the LL 322 may be used to generate a LL data PDU and/or an empty packet (such as an empty PDU) that may be transmitted using a LL communication link established with another BLE device using the LL 322

The L2CAP 318 may encapsulate multiple protocols from the upper layers into a link layer data PDU and/or a QLL establishment PDU (and vice versa). The L2CAP 318 may also break large link layer data PDUs and/or a QLL establishment PDUs from the upper layers into segments that fit into a maximum payload size (such as 27 bytes) on the transmit side. Similarly, the L2CAP 318 may receive multiple link layer data PDUs and/or QLL establishment PDUs that have been segmented, and the L2CAP 318 may combine the segments into a single link layer data PDU and/or a QLL establishment PDU that may be sent to the upper layers.

The ATT 316 may be a client/server protocol based on attributes associated with a BLE device configured for a particular purpose (such as monitoring heart rate, monitoring temperature, broadcasting advertisements, etc.). The attributes may be discovered, read, and written by other BLE enabled devices. The set of operations which are executed over ATT 316 may include, but are not limited to, error handling, server configuration, find information, read operations, write operations, queued writes, etc. The ATT 316 may form the basis of data exchange between BLE devices.

The SM 314 may be responsible for device pairing and key distribution. A security manager protocol implemented by the SM 314 may define how communications with the SM of a counterpart BLE deice are performed. The SM 314 may provide additional cryptographic functions that may be used by other components of the modified BLE protocol stack 300. The architecture of the SM 314 used in BLE may be designed to minimize recourse requirements for peripheral devices by shifting work to a central device. The SM 314 provides a mechanism to not only encrypt the data but also to provide data authentication.

The GATT 312 describes a service framework using the attribute protocol for discovering services, and for reading and writing characteristic values on a counterpart BLE device. The GATT 312 interfaces with the App 308 through the App's profile. The App 308 profile defines the collection of attributes and any permission associated with the attributes to be used in BLE communications. One of the benefits of BT technology is device interoperability. To assure interoperability, using a standardized wireless protocol to transfer bytes of information may be inadequate, and hence, sharing data representation levels may be needed. In other words, BLE devices may send or receive data in the same format using the same data interpretation based on intended device functionality. The attribute profile used by the GATT 312 may function as a bridge between the modified BLE protocol stack and the application and functionality of the BLE device (at least from a wireless connection point of view), and is defined by the profile.

The GAP 310 may provide an interface for the App 308 to initiate, establish, and manage connection with counterpart BT/BLE devices. The profile layer 364 may include a set of BT/BLE profiles including, but not limited to, A2DP, AVRCP, HFP, and the like. The profiles of the profile layer 364 may operate over the L2CAP 318. The BToIP Service 352 may determine whether a peripheral device (such as one of the peripheral devices 104, 106, 108, 110, 112, or 114 of FIG. 1) supports BToIP protocol and/or is enabled to communicate via BToIP protocol. The BToIP Service 352 may be configured to exchange features (such as control point notifications) with the second device based on some triggers, events, and/or conditions detected or determined by the first device (such as via processor 202 of the first device). The exchanged features (such as the control point notifications) may indicate to the second device one or more actions the second device may perform.

The QHCI 354 may determine whether a Bluetooth packet is to be transmitted using a traditional Bluetooth protocol or using the BToIP protocol disclosed herein. The BToIP protocol bearer may be a software enabled access point (softAP) or an access point (AP). A BToIP protocol bearer may operate over multiple globally accepted ISM bands including, but not limited to, the 2.4 GHz ISM band, the 5 GHz ISM band, the 6 GHz ISM band, and the like. In some implementations, a WLAN radio of the device and/or the App layer 308 of the device may be configured to select one of the globally accepted ISM band over which the BToIP protocol bearer operates.

If the QHCI 354 determines that the Bluetooth packet and/or payload is to be transmitted via the BToIP protocol, then the QHCI 354 may route the Bluetooth packet and/or payload to the BToIP AC 356. In some aspects, the QHCI 354 may indicate to the BToIP AC 356 that the Bluetooth packet and/or payload is to be transmitted using the BToIP protocol.

The BToIP AC 356 may be configured to encapsulate data packets in a manner indicating that the data packets are to be transmitted over a WLAN channel or link using the BToIP protocol. For example, the BToIP AC 356 may add, to each data packet that is to be transmitted using the BToIP protocol, a header indicating that the respective data packet is formatted for transmission based on the BToIP protocol. The BToIP AC 356 may also be configured to decapsulate data packets received using the BToIP protocol, and forward the decapsulated data to other layers of the BToIP protocol stack 300. In some aspects, the BToIP AC 356 may decapsulate received BToIP packets by stripping the BToIP headers from the received BToIP packets and forwarding the decapsulated data to the other layers of the BToIP protocol stack 300.

The TCP/IP stack 358 may encapsulate BToIP packets with TCP/IP or TCP/UDP headers and forward the encapsulated BToIP packets to the WLAN MAC 330. The TCP/IP stack 358 may decapsulate packets received via the BToIP link and forward the decapsulated data to the other layers of the BToIP protocol stack 300. The WLAN PHY 332 may transmit BToIP packets to, and receive BToIP packets from, a peripheral device over a WLAN channel or link. In some aspects, the WLAN MAC 330 may be responsible for low level communication over the WLAN PHY 332.

Figure 4A:
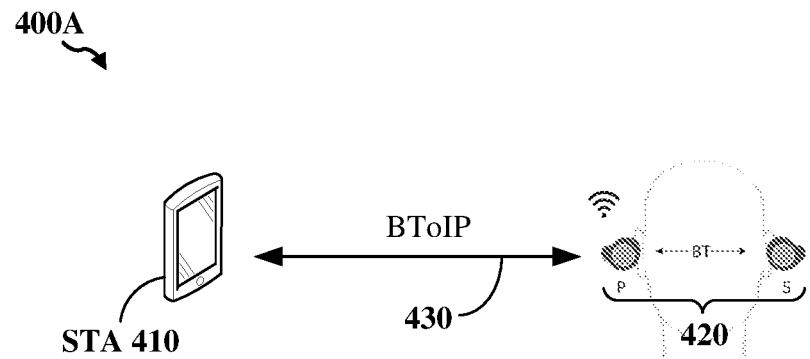
FIGS. 4A-4B show example topologies of a wireless network that supports wireless communications using the BToIP protocol disclosed herein.
Figure 4B:
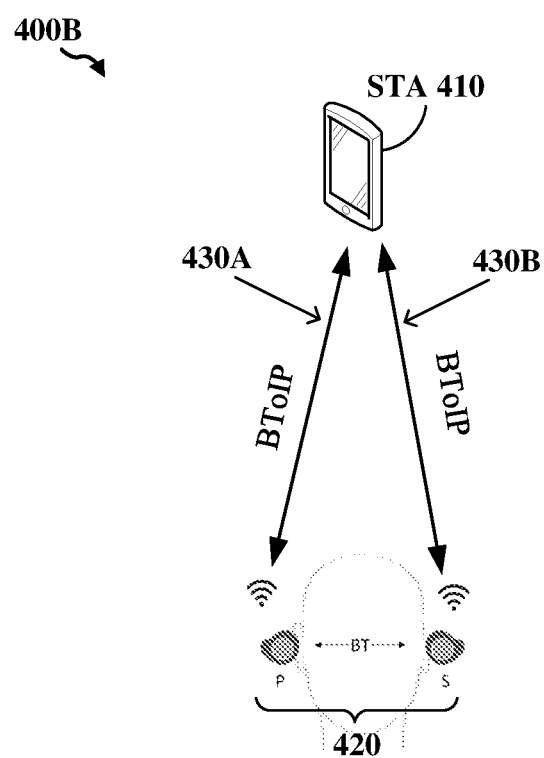

FIGS. 4A-4B show example topologies of wireless networks that support wireless communications using the BToIP disclosed herein. For example, FIG. 4A shows an example wireless network 400A that includes a STA 410 and a pair of earbuds 420 that may be paired with each other via a Bluetooth connection. In some implementations, the STA 410 may be one example of the central device 102 of FIG. 1, and the peripheral device 420 may be one example of the peripheral device 112 of FIG. 1. In various aspects, the STA 410 and earbuds 420 are also connected by a communication link 430 over which the STA 410 and the earbuds 420 may exchange data and other information with each other based on the BToIP disclosed herein. As discussed, the BToIP allows the STA 410 to transmit Bluetooth-encoded data (such as an audio stream or a video stream) to the earbuds 420 over the communication link 430 using frames or packets compliant with the IEEE 802.11 family of wireless communication standards.

The communication link 430 may be any suitable contention-based communication link that allows the STA 410 and the peripheral device 420 to communicate with each other using WLAN-compliant data packets. In some aspects, the communication link 430 may be a Wi-Fi link such as (but not limited to) a P2P link, a TDLS link, or a Wi-Fi Direct link. In some instances, the STA 410 may implement a softAP that operates on the same wireless channels as the STA 410, and the earbuds 420 may be associated with the softAP. In this way, the earbuds 420 may be associated with the softAP, which may allow the STA 410 to communicate directly with the earbuds 420 over the communication link 430 without tunneling through an access point (AP).

FIG. 4B shows an example wireless network 400B that includes the STA 410 and earbuds 420 described with reference to FIG. 4A. The wireless network 400B is similar to the wireless network 400A of FIG. 4A, except that the first and second earbuds (P and S, respectively) in the example of FIG. 4B have direct communication links 430A and 430B, respectively, with the STA 410. In this example, the STA 410 may transmit a data stream to each of the first earbud (P) and the second earbud (S) via respective communication links 430A and 430B, concurrently.

Figure 5A:
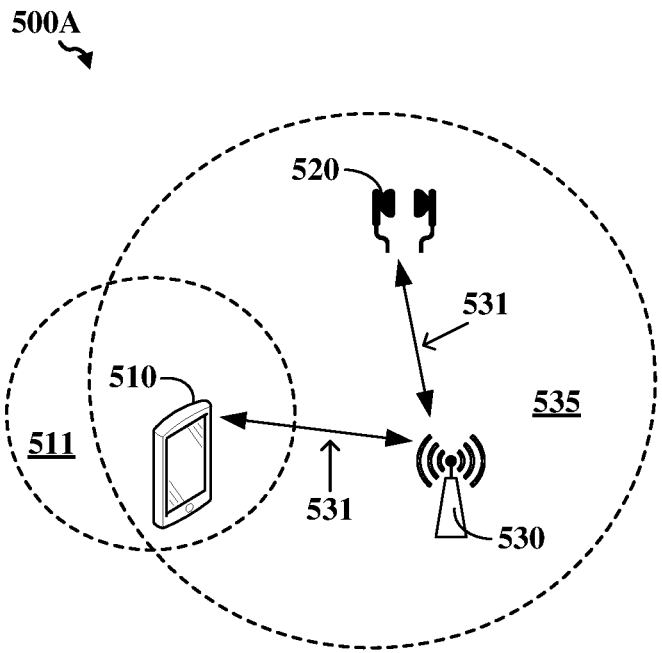
FIGS. 5A-5B show example topologies of other wireless networks that support wireless communications using the BToIP protocol disclosed herein.
Figure 5B:
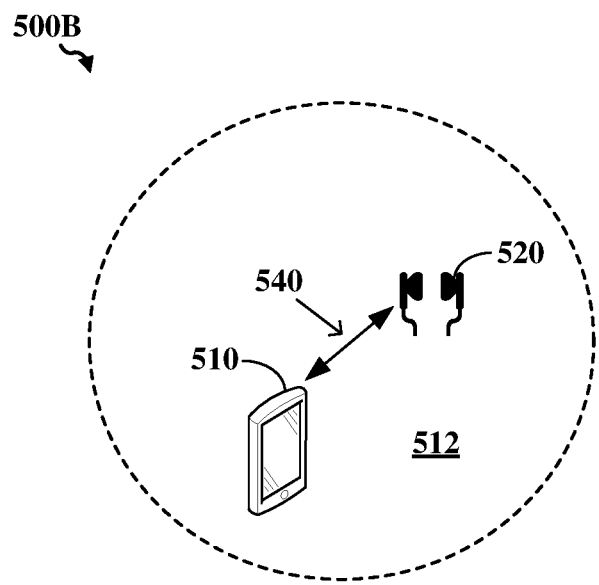

FIGS. 5A-5B show example topologies of other wireless networks 500A and 500B that support wireless communications using the BToIP disclosed herein. The wireless network 500A of FIG. 5A is shown to include a STA 510, a pair of earbuds 520 that may be paired with the STA 510 via a Bluetooth connection, and an AP 530. In some implementations, the STA 510 may be one example of the central device 102 of FIG. 1, and the earbuds 520 may be one example of the peripheral device 112 of FIG. 1. The AP 530 may operate a BSS on one or more wireless channels, and may provide a wireless coverage area 535 for WLAN communications over the one or more wireless channels. The STA 510 may be associated with the AP 530, and may receive data streams directly from the AP 530 over one or more WLAN channels 531. The STA 510 may also provide a wireless coverage area 511 for Bluetooth communications with the earbuds 520.

In the example of FIG. 5A, the earbuds 520 are located outside of the Bluetooth coverage area 511 provided by the STA 510, and therefore the STA 510 may not be able to transmit a data stream to the earbuds 520 via the Bluetooth connection. In various aspects, the earbuds 520 may also be associated with the AP 530. Specifically, the earbuds 520 may operate as a client device of the AP 530, and may receive data streams directly from the AP 530 over the one or more WLAN channels 531 based on the BToIP disclosed herein.

FIG. 5B shows an example wireless network 500B that includes the STA 510 and the earbuds 520 described with reference to FIG. 5A. In the example of FIG. 5B, the earbuds 520 are located within a wireless coverage area 512 provided by the STA 510. As such, the STA 510 and earbuds 520 may communicate with each other directly, without the presence of an AP, using a communication link 540. In various aspects, the communication link 540 allows the STA 510 and the earbuds 520 to exchange data and other information with each other based on the BToIP protocol disclosed herein. The communication link 540 may be any suitable contention-based communication link that allows the STA 510 and the earbuds 520 to communicate with each other using WLAN-compliant data packets. In some aspects, the communication link 540 may be a Wi-Fi link such as (but not limited to) a P2P link, a TDLS link, or a Wi-Fi Direct link.

Figure 6:
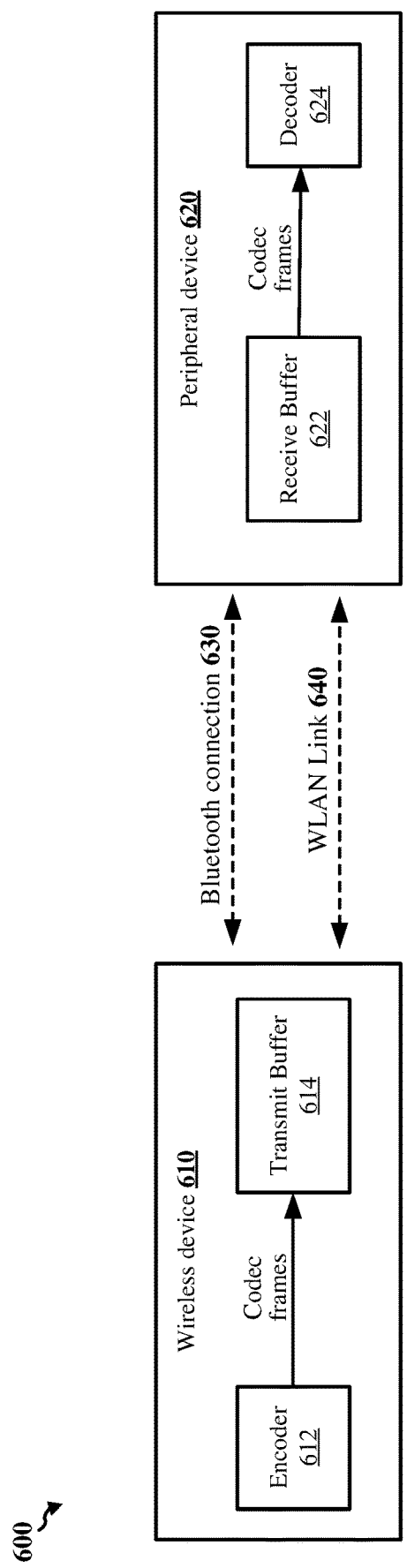
FIG. 6 depicts communications between a wireless device and a peripheral device over a Bluetooth connection and a WLAN link, according to various aspects of the present disclosure.

FIG. 6 depicts communications 600 between a wireless device 610 and a peripheral device 620 over a Bluetooth connection 630 and a WLAN link 640, according to various aspects of the present disclosure. In some implementations, the wireless device 610 may be one example of the central device 102 of FIG. 1 or the wireless device 200 of FIG. 2, and the peripheral device 620 may be an example of one or more of the peripheral devices 104, 106, 108, 110, 112 or 114 of FIG. 1. In some instances, the peripheral device 620 may be a pair of earbuds such as the earbuds 420 of FIGS. 4A-4B or the earbuds 520 of FIGS. 5A-5B. The WLAN link 640 may be one or more wireless channels operated by or associated with a WLAN (or any other suitable wireless network). In various aspects, the wireless channels may be in the 2.4 GHz frequency band, the 5 GHz frequency band, the 6 GHz frequency band, or the 60 GHz frequency band. In some instances, the WLAN link 640 may be a P2P link, a TDLS link, a Wi-Fi Direct link, a link associated with a Group Owner (GO), or a link associated with a Neighborhood Area Network (NAN). The Bluetooth connection 630 may be any suitable Bluetooth-compliant link or channel including (but not limited to) an asynchronous connectionless (ACL) link, a Logical Link Control and Adaptation Protocol (L2CAP) link, an Advanced Audio Distribution Profile (A2DP) link, a synchronous connection-oriented (SCO) link, or an isochronous (ISO) link.

The wireless device 610 is shown to includer an encoder 612 and a transmit buffer 614. The encoder 612 may be configured to encode data, such as audio or video data, using a specified bitrate. The transmit buffer 614 may be configured to queue data packets that are to be transmitted to the peripheral device 620 over the Bluetooth connection 630 or the WLAN link 640. In some implementations, the data packets to be transmitted to the peripheral device 620 may be of a predefined size, for example, based whether the transmission is over the Bluetooth connection 630 or the WLAN link 640 and/or the channel conditions of the link or connection. In some aspects, data encoded by the encoder 612 may be packetized into a data packet of a predefined size. The wireless device 610 may de-queue data packets from the transmit buffer 614 and transmit the data packets to the peripheral device 620 over the Bluetooth connection 630 or the WLAN link 640.

The peripheral device 620 is shown to includer a receive buffer 622 and a decoder 624. Data packets received over the Bluetooth connection 630 or the WLAN link 640 may be queued or otherwise stored in the receive buffer 622. The data packets may be output from the receive buffer 622 and forwarded to the decoder 624. In some aspects, the decoder 624 may decode data (such as audio and/or video data) carried in the payloads of the queued data packets, and forward the decoded data to upper layers of the protocol stack for processing and playback to a user.

In some implementations, the encoder 612 may encode a first encoder/decoder (codec) frame using a first bitrate, and forward the first codec frame to the transmit buffer 614 to be packetized for transmission to the peripheral device 620 over the Bluetooth connection 630 or the WLAN link 640. For instances in which the first codec frame is too large to be packetized within a data packet of the predefined size, a first portion of the first codec frame that fits within a data packet may be de-queued from the transmit buffer 614 and transmitted to the peripheral device 620 over the Bluetooth connection 630 or the WLAN link 640. A second portion of the first codec frame, which did not fit within the data packet transmitted to the peripheral device 620, may be transmitted to the peripheral device 620 in a subsequent data packet.

The peripheral device 620 may queue the received data packet in the receive buffer 622, and may forward the first portion of the first codec frame to the decoder 624 for decoding. In some instances, the decoder 624 may not be able to decode the first portion of the first codec frame without the second portion of the first codec frame. The resulting delay in decoding the first codec frame may cause "jitter" in the playback of audio and/or video data carried in the first codec frame, which may adversely impact user experience. In some instances, the delay in timely delivery of the first codec frame to the peripheral device 620 may be reduced by increasing the bitrate used to encode the data. In other instances, the delay in timely delivery of the first codec frame to the peripheral device 620 may be reduced by increasing the transmit power level used for transmitting data packets over the Bluetooth connection 630 to the peripheral device 620.

Figure 7:
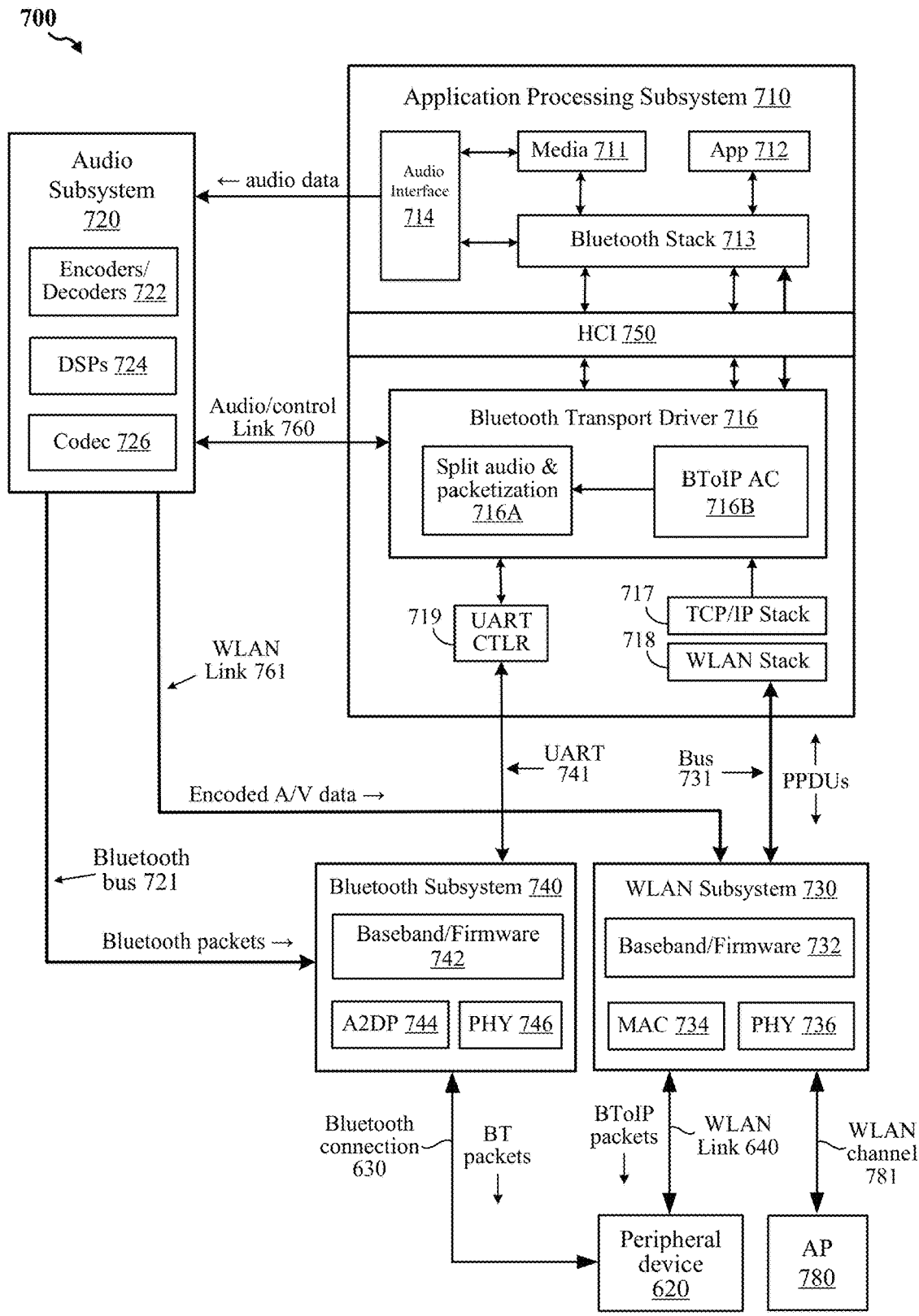
FIG. 7 shows a block diagram of another example wireless device, according to various aspects of the present disclosure.

FIG. 7 shows a block diagram of another example wireless device 700, according to various aspects of the present disclosure. In some implementations, the wireless device 700 may be an example of the central device 102 of FIG. 1, the wireless device 200 of FIG. 2, or the wireless device 610 of FIG. 6. In some instances, the wireless device 700 may operate as a STA that can transmit data to and receive data from an associated AP 780 over a wireless channel 781 of a WLAN, while also operating as a softAP that can transmit data to and receive data from the peripheral device 620 over the WLAN link 640 using the BToIP protocol disclosed herein. In some instances, the peripheral device 620 may be paired with the wireless device 700 based on the Bluetooth or BLE protocol. For example, in some aspects, the peripheral device 620 may be a pair of earbuds or headphones that can exchange Bluetooth-encoded data and other signals with the wireless device 700 over the Bluetooth connection 630 using a Bluetooth or BLE protocol, and can also exchange Bluetooth-encoded data and other information with the wireless device 700 over the WLAN link 640 using the BToIP protocol disclosed herein.

The wireless device 700 may include an Application Processing subsystem 710, an Audio subsystem 720, a WLAN subsystem 730, a Bluetooth subsystem 740, and a Host Controller Interface (HCI) 750. The Application Processing subsystem 710, which may correspond to at least some portions of the application layer and the Host block of the BToIP protocol stack 300 of FIG. 3, is shown to include a media player 711, an Application Layer (App) 712, a Bluetooth stack 713, and an audio interface 714. The media player 711 can be suitable device or component capable of generating or receiving multimedia content including, for example, real-time audio streams, real-time video streams, real-time gaming streams, and other latency-sensitive traffic. The Application Layer 712, which may be one implementation of the Application block 302 of FIG. 3, includes at least one Bluetooth profile that defines the collection of attributes and associated permissions to be used in Bluetooth or BLE communications. In some aspects, the Application Layer 712 may include processing resources including (but not limited to) the memory 206, the ROM 208, and the Flash memory 210 of FIG. 2. The Bluetooth stack 713 may be one implementation of the BToIP protocol stack 300 of FIG. 3.

The Bluetooth transport driver 716 may include a split audio and packetization module 716A and a BToIP AC 716B. The split audio and packetization module 716A may be responsible for packetizing data (such as audio and/or video data) into Bluetooth frames that can be transmitted to the peripheral device 620 using either a Bluetooth/BLE protocol or the BToIP protocol disclosed herein. The BToIP AC 716B, which may be one example of the BToIP AC 356 of FIG. 3, may be configured to encapsulate Bluetooth packets in a manner that indicates whether the Bluetooth packets are to be transmitted using the Bluetooth/BLE protocol or the BToIP protocol disclosed herein, as described with reference to FIG. 3. For example, the BToIP AC 716B may add headers to the Bluetooth packets indicating that the Bluetooth packets are to be transmitted to the peripheral device 620 using the BToIP protocol disclosed herein. The BToIP AC 716B may also be configured to decapsulate data packets received over the WLAN link 640 and forward the decapsulated data to other layers of the Bluetooth stack 713. Further, although shown in the example of FIG. 7 as provided in the Host, in other implementations, the BToIP AC 716B may be provided within the WLAN subsystem 730.

The Bluetooth transport driver 716 is connected to the audio subsystem 720 via an audio and control link 760. In some instances, the audio and control link 760 may be used to send encoded audio/video data and control signals between the Bluetooth transport driver 716 and audio/video DSPs within the audio subsystem 720. The TCP/IP stack 717 allows the wireless device 700 to exchange data and control information with corresponding layers of a TCP/IP stack implemented in the peripheral device 620. For example, the TCP/IP stack 717 may be used to format frames or packets for transmission based on the TCP/IP transmission protocol, and may be used to extract data from frames or packets received based on the TCP/IP transmission protocol.

The WLAN stack 718 allows the wireless device 700 to exchange data and control information with corresponding layers of a WLAN stack implemented in the AP 780 and/or with corresponding layers of a WLAN stack implemented in the peripheral device 620. For example, the WLAN stack 718 may be used to format frames or packets for transmission as IEEE 802.11-compliant PPDUs to the AP 780 over the WLAN channel 781, and may be used to extract data from IEEE 802.11-compliant PPDUs received from the AP 780 over the WLAN channel 781. In some instances, the WLAN stack 718, the TCP/IP stack 717, and the UART controller 719 may correspond to a Kernel space of the Application Processing subsystem 710. The UART 741, which is managed by the UART controller 719, provides a 3-wire interface (such as a transmit wire, a receive wire, and a ground wire) between the application processing subsystem 710 and the Bluetooth subsystem 730. A bus 731 provides a connection between the WLAN stack 718 and the WLAN subsystem 730. The bus 731 may be any suitable bus, signal line, or signaling that can be used to exchange PPDUs, control information, and other signals between the WLAN stack 718 and the WLAN subsystem 730. For example, in some aspects, the bus 731 may be a PCIe bus, soundwire, an Inter-IC Sound (I2S) bus, and the like.

The Audio subsystem 720 may include encoders/decoders 722, one or more digital signal processors (DSPs) 724, and one or more codecs 726. The encoders/decoders 722 may be used to sample audio/video data extracted from one or more PPDUs received over one or more WLAN channels 781 and processed in the Application Processing block 710 based at least in part on a Bluetooth profile. In some implementations, the encoders/decoders 722 may partition the sampled audio/video data into payloads that can be embedded within one or more Bluetooth packets for transmission to the peripheral device 620 over the Bluetooth connection 630. In some other implementations, the encoders/decoders 722 may partition the sampled audio/video data into Ethernet frames or packets that can be encapsulated within IEEE 802.11-compliant PPDUs for transmission to the peripheral device 620 over the WLAN link 640. In some instances, the DSPs 724 and/or the codecs 726 may employ one or more encoding or decoding algorithms in conjunction with sampling the audio data.

The WLAN subsystem 730 may include a WLAN baseband circuit and firmware block 732, a MAC layer 734, and a PHY 736. The WLAN firmware may control operations of the WLAN subsystem 730, and may determine the protocol and configuration of one or both of the MAC layer 734 or the PHY 736. The WLAN baseband circuit may decode and/or process received data at baseband frequency, and may process and encode outgoing data at baseband frequency. The MAC layer 734 and the PHY 736 are collectively responsible for embedding outgoing data into MAC frames (such as MSDUs), encapsulating the MAC frames into data packets (such as PPDUs), and transmitting the data packets over the WLAN channel 781 to one or more other wireless devices. The MAC layer 734 and the PHY 736 are also collectively responsible for receiving data packets (such as PPDUs) over the WLAN channel 781, extracting data from the MAC frames encapsulated in the received data packets, and decoding the extracted data.

Specifically, when the WLAN subsystem 730 is in a receive mode, the PHY 736 may be used to receive, demodulate, and down-convert PPDUs received over the WLAN channel 781, and the MAC layer 734 may be used to decode data encapsulated in the received PPDUs. The MAC layer 734 may also forward the decoded data to the Application Processing subsystem 710 via the HCI 750. When the WLAN subsystem 730 is in a transmit mode, the MAC layer 734 may be used to construct and format MAC frames to carry data provided by the upper layers, and the PHY 736 may encapsulate the MAC frames within one or more PPDUs for transmission over the WLAN channel 781. In some aspects, the PHY 736 may define the mechanism for transmitting A/V bitstreams to the peripheral device 620 over the WLAN link 640 based on the BToIP protocol disclosed herein.

The Bluetooth subsystem 740 may include a Bluetooth baseband circuit and firmware block 742, an advanced audio distribution profile (A2DP) circuit 744, and a PHY 746. The Bluetooth baseband circuit and firmware block 742 may be used to generate baseband signals for constructing and deconstructing data frames based on the Bluetooth or BLE protocol. The Bluetooth baseband circuit and firmware block 742 may also be used to generate carrier signals for up-converting baseband signals during data transmissions and for down-converting received data signals to baseband. The A2DP circuit 744 may be used to control or manage an A2DP link between the wireless device 700 and the peripheral device 620. Specifically, when the Bluetooth subsystem 740 is in a receive mode, the PHY 746 can be used to receive, demodulate, and down-convert data packets received over the Bluetooth connection 630, and to forward the data packets to the Application Processing subsystem 710. When the Bluetooth subsystem 740 is in a transmit mode, the PHY 746 can be used to encapsulate data provided from the upper layers into one or more Bluetooth frames or packets for transmission to the peripheral device 620 over the Bluetooth connection 630.

In various aspects, the wireless device 700 may include a WLAN link 761 connected between the Audio subsystem 720 and the WLAN subsystem 730. The WLAN link 761 may provide a direct link or channel over which Bluetooth-encoded audio/video data can be sent from the audio subsystem 720 to the WLAN subsystem 730 without passing through or accessing the Application Processing subsystem 710. Specifically, the WLAN link 761 may allow Bluetooth-encoded data to be forwarded directly from the audio subsystem 720 to the WLAN subsystem 730 for transmission to the peripheral device 620 over the WLAN link 640 without consuming processing cycles of the application processor, thereby avoiding latencies associated with the application processor and also avoiding latencies associated with the TCP/IP stack 717. In this way, the WLAN link 761 can reduce jitter and latency by directly routing Bluetooth-encoded data from the audio subsystem 720 to the WLAN subsystem 730.

In some instances, the wireless device 700 may transmit the data stream to the peripheral device 620 using a Target Wake Time (TWT) operation specified by the 802.11ax, 802.11be, and later amendments to the IEEE 802.11 family of wireless communication standards. In other instances, the wireless device 700 may transmit the data stream to the peripheral device 620 using a restricted-TWT (r-TWT) operation specified by the 802.11be and later amendments to the IEEE 802.11 family of wireless communication standards. The restricted TWT operation allows the wireless device 700 to establish one or more r-TWT service periods (SPs) that can be used to provide more predictable latency, reduced worst case latency, reduced jitter, and higher reliability for latency-sensitive traffic. For example, all peripheral devices that support restricted TWT operation that are TXOP holders outside of any r-TWT SP for which they are not a member to end their respective TXOPs before the start of the r-TWT SP. In some aspects, membership in a r-TWT SP may be reserved exclusively for peripheral devices associated with latency-sensitive traffic.

Figure 8A:
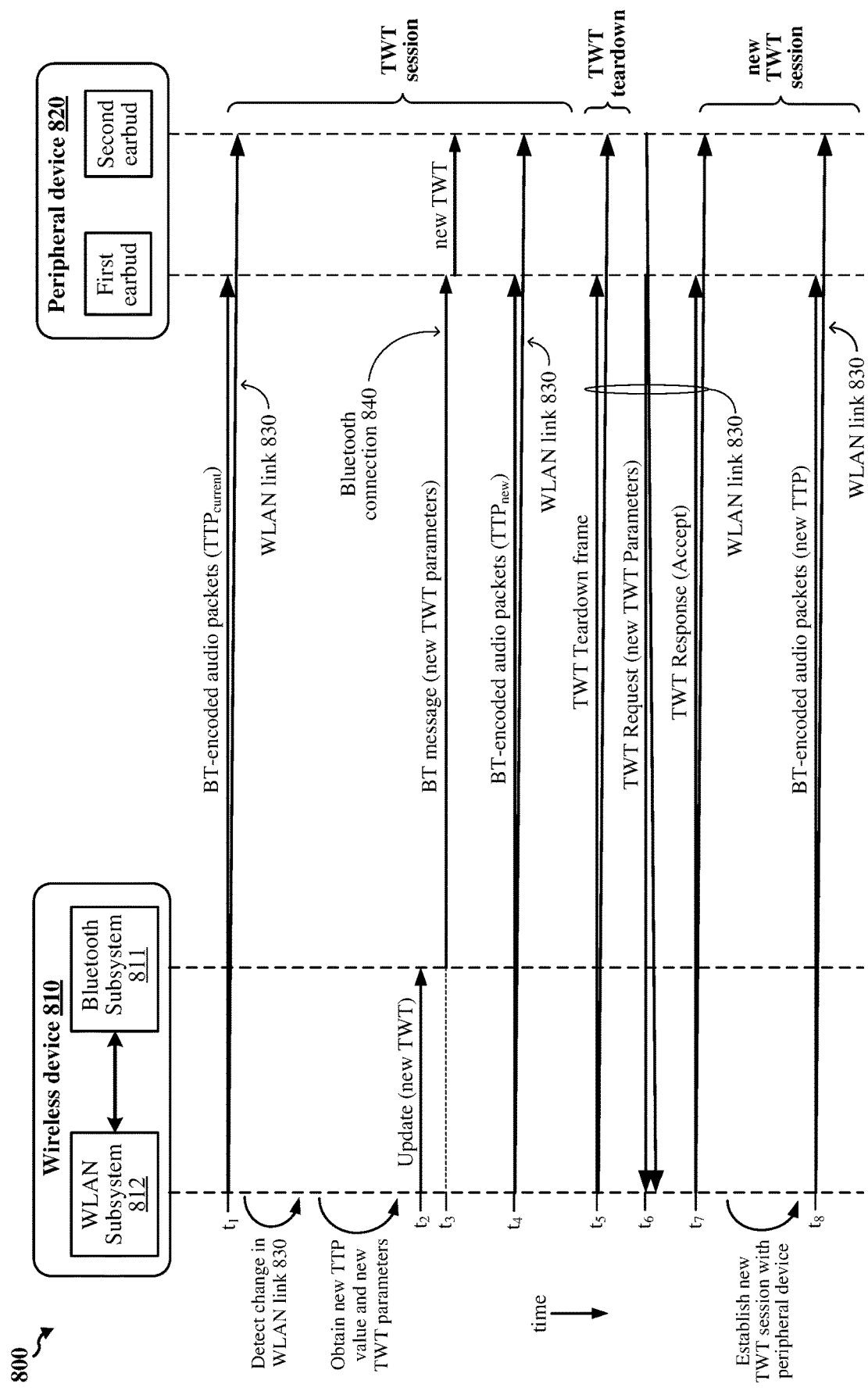
FIG. 8A shows a sequence diagram depicting an example wireless communication that supports a wireless device and a peripheral device renegotiating Target Wake Time (TWT) parameters, according to various aspects of the present disclosure.

FIG. 8A shows a sequence diagram depicting an example wireless communication 800 that supports a wireless device and a peripheral device renegotiating one or more TWT parameters, according to various aspects of the present disclosure. The wireless communication 800 may be performed between a wireless device 810 and a peripheral device 820. The wireless device 810 may be an example of the central device 102 of FIG. 1, the wireless device 200 of FIG. 2, the wireless device 610 of FIG. 6, or the wireless device 700 of FIG. 7. In some instances, the wireless device 810 may operate as a STA associated with a WLAN while also operating as a softAP paired with a peripheral device based on a Bluetooth protocol. The peripheral device 820 may be associated with the softAP of the wireless device 810 via a WLAN link 830, and may be paired with the softAP over a Bluetooth connection 840.

In some instances, the peripheral device 820 may be an example of one or more of the peripheral devices 104, 106, 108, 110, 112, or 114 of FIG. 1, the earbuds 420 of FIGS. 4A-4B, the earbuds 520 of FIGS. 5A-5B, or the peripheral device 620 of FIGS. 6-7. In the example of FIG. 8A, the peripheral device 820 is shown as a pair of earbuds that includes a first earbud and a second earbud. The first earbud may be closer to the wireless device 810 than the second earbud, and therefore data packets transmitted by the wireless device 810 may arrive at the first earbud before arriving at the second earbud. In some aspects, the first earbud may be designated as the primary earbud, and the second earbud may be designated as the secondary earbud.

The wireless device 810 may include at least a Bluetooth subsystem 811 and a WLAN subsystem 812 coupled to each other. Although not shown in FIG. 8A for simplicity, the Bluetooth subsystem 811 may include a Bluetooth host, a Bluetooth MAC, and a Bluetooth PHY, and the WLAN subsystem 812 may include a WLAN host and WLAN firmware. The Bluetooth host may operate in conjunction with the Bluetooth MAC and PHY to allow the wireless device 810 to communicate with the peripheral device 820 over the Bluetooth connection 840. The WLAN host and WLAN firmware may be used to format, encode, and transmit WLAN-compliant packets (such as one or more of the PPDUs described in the IEEE 802.11 family of wireless communication standards) to the peripheral device 820 over the WLAN link 830. The WLAN host and WLAN firmware may also be used to decode packets received from the peripheral device 820 over the WLAN link 830.

Prior to time $t_1$, the wireless device 810 may establish a first TWT session with the peripheral device 820 on the WLAN link 830. As discussed, a TWT session may reduce the worst case latency and jitter of data streams transmitted to the peripheral device 820 over the WLAN link. In some instances, the first TWT session may be a restricted TWT (r-TWT) operation specified by the 802.11be and later amendments to the IEEE 802.11 family of wireless communication standards. The r-TWT operation allows the wireless device 810 to establish one or more r-TWT service periods (SPs) that can be used to provide more predictable latency, reduced worst case latency, reduced jitter, higher reliability, and/or enhanced channel protection for latency-sensitive traffic. In some aspects, latency-sensitive traffic, which may include the audio stream, may be transmitted from the wireless device 810 to the peripheral device 820 over a P2P link (not shown for simplicity).

For example, at time $t_1$, the WLAN subsystem 812 transmits one or more first Bluetooth-encoded audio frames over the WLAN link 830 to the first and second earbuds of the peripheral device 820 during the first TWT session. The one or more first Bluetooth-encoded audio frames may carry audio data associated with an audio stream transmitted from the softAP of the wireless device 810 over the WLAN link 830 to the first and second earbuds of the peripheral device 820. The one or more first Bluetooth-encoded audio frames may indicate a current TTP value for the audio stream. As discussed, the TTP value may be used by the first and second earbuds of the peripheral device 820 to determine the instance in time at which audio data carried by the Bluetooth-encoded audio frames is to be played for a user of the peripheral device 820.

After time $t_1$, the wireless device 810 detects a change in the WLAN link 830 that may impact the quality of the audio stream and/or may adversely affect the user's experience. As discussed, the detected change in the WLAN link 830 may include one or more of a degradation of channel conditions on the WLAN link 830, a decrease in a channel quality indicator (QCI) of the WLAN link 830, a decrease in the MCS used to transmit the Bluetooth-encoded audio frames over the WLAN link 830 to the peripheral device 820, an increase in a packet error rate (PER) associated with the WLAN link 830, an increase in latencies associated with transmission of the Bluetooth-encoded audio frames over the WLAN link 830, or an increase in a number of retransmission attempts of one or more Bluetooth-encoded audio frames over the WLAN link 830.

In some implementations, the wireless device 810 may select, determine, or otherwise obtain one or more new TWT parameters based on the detected change in the WLAN link 830. In some instances, the one or more new TWT parameters may include at least one of a TWT wake duration, a TWT wake interval, a TWT wake time, a minimum data rate, a mean data rate, a delay bound, or a user priority (UP) for the TWT session. By updating one or more of the TWT parameters based on the detected change in the WLAN link 830, the wireless device 810 may adjust various parameters of the TWT session with the peripheral device 820 in a manner that compensates for the detected change in the WLAN link 830.

In some instances, the wireless device 810 may select, determine, or obtain one or more new TWT parameters in response to deteriorating conditions on the WLAN link 830. For example, in some aspects, the wireless device 810 may increase the minimum data rate and the mean data rate when one or more of a decrease in the MCS, an increase in the PER, or an increase in the number of retransmission attempts is detected. For another example, the wireless device 810 may decrease the delay bound when an increase in latencies associated with the WLAN link 830 is detected. For another example, the wireless device 810 may increase the TWT wake duration and/or decrease the TWT wake interval when one or both of the degradation of channel conditions or the decrease in the CQI of the WLAN link 830 is detected.

In other instances, the wireless device 810 may select, determine, or otherwise obtain one or more new TWT parameters in response to improving conditions on the WLAN link 830. For one example, in some aspects, the wireless device 810 may increase the minimum data rate and the mean data rate when one or more of an increase in the MCS, a decrease in the PER, or a decrease in the number of retransmission attempts is detected. For another example, the wireless device 810 may decrease the delay bound when a decrease in latencies associated with the WLAN link 830 is detected. For another example, the wireless device 810 may decrease the TWT wake duration and/or increase the TWT wake interval when one or both of improved channel conditions or an increase in the CQI of the WLAN link 830 is detected.

The wireless device 810 may also select, determine, or otherwise obtain a new TTP value responsive to detecting changes in the WLAN link 830. In some implementations, the Bluetooth subsystem 811 may select or determine the new TTP value based on a duration of time associated with establishing a new TWT session with the peripheral device 820 over the WLAN link 830. Specifically, in some instances, the Bluetooth subsystem 811 may select the TTP value such that the time period between a first time indicated by the current TTP value and a second time indicated by the new TTP value is equal to or greater than the duration of time associated with establishing the new TWT session. For example, in an example implementation for which the wireless device 810 and the peripheral device 820 need approximately 25 milliseconds (ms) to establish the new TWT session with one another, the Bluetooth subsystem 811 may select the TTP value such that the time period between the first time indicated by the current TTP value and the second time indicated by the new TTP value is at least 25 ms. In this way, aspects of the present disclosure may ensure that the peripheral device 820 is able to play audio data received over the WLAN link 830 during different TWT sessions for the user without interruption or degradation in quality of the audio stream.

In various implementations, the new TTP value may also be based, at least in part, on the size of, or available space in, the data buffers used by the peripheral device 820 to store audio data extracted from Bluetooth-encoded audio frames received from the wireless device 810 over the WLAN link 830. In some instances, as the available space in the data buffers increases, the TTP value may be increased, for example, to allow the wireless device 810 and the peripheral device 820 more time to establish a new TWT session based on the one or more new TWT parameters. Conversely, as the available space in the data buffers decreases, the TTP value may be decreased, for example, to ensure that there is sufficient available space in the data buffers for the peripheral device 820 to store audio data extracted from Bluetooth-encoded audio frames received over the WLAN link 830 from the wireless device 810.

At time $t_2$, the wireless device 810 uses the WLAN subsystem 812 to send an update message indicating the one or more new TWT parameters to the Bluetooth subsystem 811 of the wireless device 810. In some instances, the update message may indicate that the WLAN subsystem 812 intends to renegotiate at least one of the TWT parameters associated with the first TWT session. In response thereto, the Bluetooth subsystem 811 sends a Bluetooth message indicating the one or more new TWT parameters to the peripheral device 820 over the Bluetooth connection 840, at time t3.

The peripheral device 820 receives the Bluetooth message, and updates its TWT parameters to include the one or more new TWT parameters carried in the Bluetooth message. In some instances, the first earbud of the peripheral device 820 receives the Bluetooth message, updates its TWT parameters to include the one or more new TWT parameters, and sends a message indicating the one or more new TWT parameters to the second earbud of the peripheral device 820. In response thereto, the second earbud updates its TWT parameters to include the one or more new TWT parameters. In this way, the wireless device 810 may use the Bluetooth connection 840 as a side-channel to send TWT parameters and other control information to the peripheral device 820.

In some implementations, reception of the Bluetooth message indicating the one or more new TWT parameters may be associated with an implicit instruction to request a new TWT session with the wireless device 810 based on the new TWT parameters. In some instances, the implicit instruction may instruct the peripheral device 820 to request the new TWT session after receiving a TWT tear down frame from the wireless device 810. In other implementations, the wireless device 810 may transmit an explicit instruction for the peripheral device 820 to request the new TWT session based on the new TWT parameters in response to receiving the TWT tear down frame. In some aspects, the wireless device 810 may send a Bluetooth message carrying the explicit instruction to the peripheral device 820 over the Bluetooth connection 840.

At time $t_4$, the wireless device 810 uses the WLAN subsystem 812 to transmit one or more additional Bluetooth-encoded audio frames over the WLAN link 830 to the first and second earbuds of the peripheral device 820 during the first TWT session. The one or more additional Bluetooth-encoded audio frames carry audio data associated with the audio stream, and may indicate the new TTP value obtained by the wireless device 810. Each of the first and second earbuds of the peripheral device 820 receives the one or more additional Bluetooth-encoded audio frames, and updates its TTP value based on the new TTP value. Thereafter, the first and second earbuds of the peripheral device 820 may play audio data associated with the received audio stream to the user based on the new TTP value. In some other instances, the first earbud of the peripheral device 820 receives the one or more additional Bluetooth-encoded audio frames, updates its TTP value based on the new TTP value, and sends a message indicating the new TTP value to the second earbud of the peripheral device 820. In response thereto, the second earbud updates its TTP value based on the new TTP value. By including the new TTP value in one or more Bluetooth-encoded audio frames transmitted to the peripheral device 820 during the first TWT session (e.g., at time $t_4$), aspects of the present disclosure may provide the first and second earbuds of the peripheral device 820 with an early indication of the new TTP value to be used during the new TWT session.

In some other implementations, the wireless device 810 may pause transmission of the Bluetooth-encoded audio frames to the peripheral device 820 for a period of time responsive to detecting the change in the WLAN link 830. In some instances, the period of time may correspond to the time period associated with the difference between the TTP value carried in the Bluetooth-encoded audio frames transmitted to the peripheral device 820 at time $t_1$ and the new TTP value. Then, after expiration of the period of time, the wireless device 810 may use the WLAN subsystem 812 to transmit one or more additional Bluetooth-encoded audio frames carrying the new TTP value to the first and second earbuds of the peripheral device 820 over the WLAN link 830.

At time $t_5$, the wireless device 810 uses the WLAN subsystem 812 to transmit a TWT tear down frame to the peripheral device 820 over the WLAN link 830. In some implementations, the TWT tear down frame is transmitted to both the first earbud and the second earbud over the WLAN link 830. Each of the first earbud and the second earbud of the peripheral device 820 receives the TWT tear down frame, and terminates the first TWT session with the wireless device 810. In some instances, reception of the TWT tear down frame may be associated with an implicit instruction to request a new TWT session with the wireless device 810 based on the new TWT parameters. In other instances, the wireless device 810 may transmit an explicit instruction for the peripheral device 820 to request the new TWT session based on the new TWT parameters in response to receiving the TWT tear down frame. In some aspects, the wireless device 810 may send a Bluetooth message carrying the explicit instruction to the peripheral device 820 over the Bluetooth connection 840.

At time $t_6$, each of the first and second earbuds of the peripheral device 820 transmits a respective TWT request frame the over the WLAN link 830 to the wireless device 810. In other aspects, one of the first and second earbuds of the peripheral device 820, such as the designated primary earbud of the peripheral device 820, may transmit a TWT request frame to the wireless device 810 on behalf of the peripheral device 820. In some instances, the TWT request frame may indicate only the new TWT parameters. In other instances, the TWT request frame may indicate a complete set of TWT parameters (including the one or more new TWT parameters). The WLAN subsystem 812 of the wireless device 810 receives the TWT request frames sent by the first and second earbuds of the peripheral device 820, and accepts the TWT parameters indicated in the respective TWT request frames. At time $t_7$, the wireless device 810 uses the WLAN subsystem 812 to transmit a TWT response frame to each of the first and second earbuds of the peripheral device 820 over the WLAN link 830. The TWT response frames may indicate acceptance, by the wireless device 810, of the TWT parameters provided by the first and second earbuds of the peripheral device 820. Thereafter, the wireless device 810 establishes a second TWT session on the WLAN link 830 with the first and second earbuds of the peripheral device 820 based at least in part on the one or more new TWT parameters.

At time $t_8$, the wireless device 810 uses the WLAN subsystem 812 to transmit one or more Bluetooth-encoded audio frames over the WLAN link 830 to the first and second earbuds of the peripheral device 820 during the second TWT session. The one or more Bluetooth-encoded audio frames carry audio data associated with the audio stream, and may indicate the new TTP value. Each of the first and second earbuds of the peripheral device 820 receives the one or more Bluetooth-encoded audio frames, and may continue playing audio data associated with the received audio stream to the user based on the new TTP value.

Figure 8B:
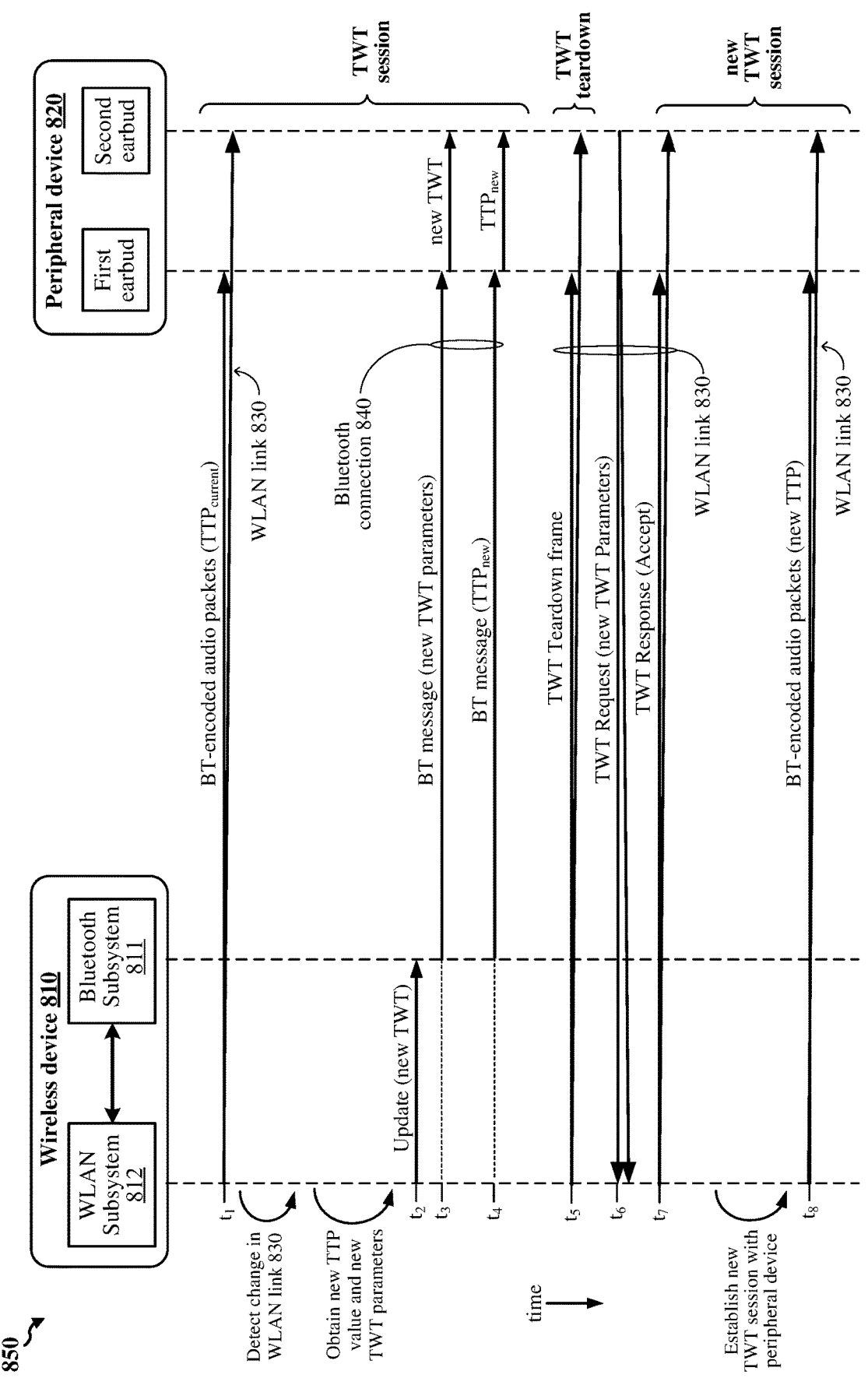
FIG. 8B shows a sequence diagram depicting another example wireless communication that supports a wireless device and a peripheral device renegotiating one or more TWT parameters, according to various aspects of the present disclosure.

FIG. 8B shows a sequence diagram depicting another example wireless communication 850 that supports a wireless device and a peripheral device renegotiating one or more TWT parameters, according to various aspects of the present disclosure. The wireless communication 850 may be performed between the wireless device 810 and the peripheral device 820 described with reference to FIG. 8A. In some implementations, the example wireless communication 850 is similar to the example wireless communication 800 described with reference to FIG. 800 except for the manner in which the wireless device 810 indicates the new TTP value to the peripheral device 820.

Specifically, at time $t_4$, the wireless device 810 uses the Bluetooth subsystem 811 to send a Bluetooth message indicating the new TTP value to the peripheral device 820 over the Bluetooth connection 840. The peripheral device 820 receives the Bluetooth message, and updates its TTP value based on the new TTP value. Thereafter, the peripheral device 820 may play audio data associated with the received audio stream to the user based on the new TTP value. In some instances, the first earbud of the peripheral device 820 receives the Bluetooth message, updates its TTP value based on the new TTP value, and sends a message indicating the new TTP value to the second earbud of the peripheral device 820. In response thereto, the second earbud updates its TTP value based on the new TTP value. In this way, the wireless device 810 may use the Bluetooth connection as a sidelink to convey TTP values (and other parameters, control signals, and the like) to the peripheral device 820.

Figure 9:
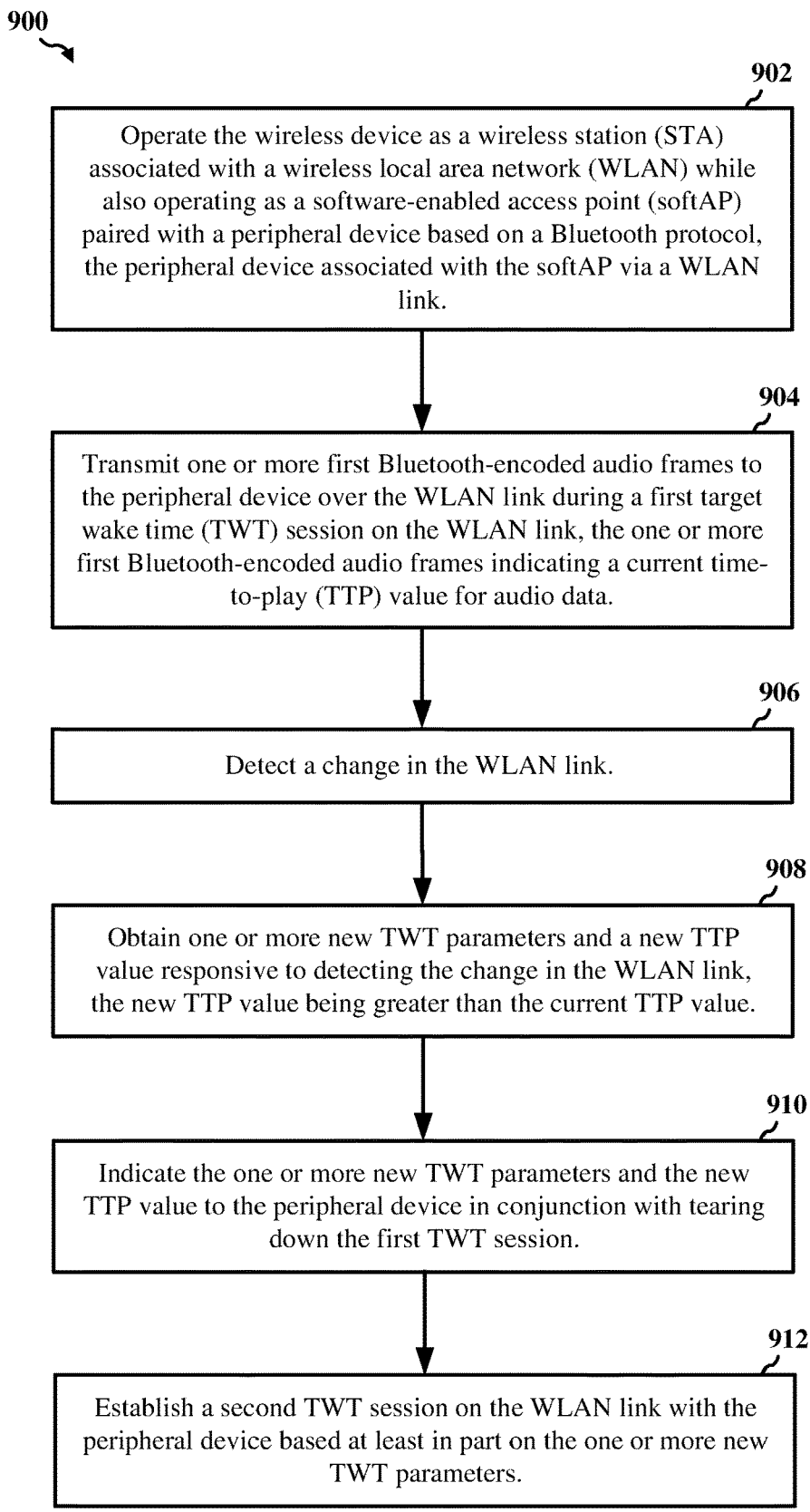
FIGS. 9-15 show flowcharts illustrating example operations for wireless communication that support a wireless device and a peripheral device renegotiating TWT parameters, according to various aspects of the present disclosure.

FIG. 9 shows a flowchart illustrating an example operation 900 for wireless communication that supports a wireless device and a peripheral device renegotiating TWT parameters, according to various aspects of the present disclosure. The operation 900 may be performed by a wireless device such as the central device 102 of FIG. 1, the wireless device 200 of FIG. 2, the wireless device 610 of FIG. 6, or the wireless device 700 of FIG. 7. In various implementations, the wireless device may be a smartphone, handset, or other suitable device that can send audio, video, and other traffic streams to the peripheral device. In some implementations, the peripheral device may be or may include headphones, headsets, earbuds, or other remote devices. In some instances, the peripheral device may be an example of one or more of the peripheral devices 104, 106, 108, 110, 112, or 114 of FIG. 1, the earbuds 420 of FIGS. 4A-4B, the earbuds 520 of FIGS. 5A-5B, or the peripheral device 620 of FIGS. 6 and 7.

For example, at 902, the wireless device operates as a wireless station (STA) associated with a wireless local area network (WLAN) while also operating as a software-enabled access point (softAP) paired with a peripheral device based on a Bluetooth protocol, the peripheral device associated with the softAP via a WLAN link. At 904, the wireless device transmits one or more first Bluetooth-encoded audio frames to the peripheral device over the WLAN link during a first target wake time (TWT) session on the WLAN link, the one or more first Bluetooth-encoded audio frames indicating a current time-to-play (TTP) value for audio data. At 906, the wireless device detects a change in the WLAN link. At 908, the wireless device obtains one or more new TWT parameters and a new TTP value responsive to detecting the change in the WLAN link, the new TTP value being greater than the current TTP value. At 910, the wireless device indicates the one or more new TWT parameters and the new TTP value to the peripheral device in conjunction with tearing down the first TWT session. At 912, the wireless device establishes a second TWT session on the WLAN link with the peripheral device based at least in part on the one or more new TWT parameters.

In various implementations, the new TTP value may be based at least in part on a size of a buffer associated with buffering the one or more second Bluetooth-encoded audio frames in the peripheral device. In some instances, a time period between a first time indicated by the current TTP value and a second time indicated by the new TTP value may be based at least in part on a duration of time associated with establishing the second TWT session on the WLAN link with the peripheral device. In some aspects, the time period may be approximately 250 milliseconds.

In some implementations, the detected change may include one or more of a degradation of channel conditions on the WLAN link, a decrease in a channel quality indicator (QCI) of the WLAN link, a decrease in a modulation and coding scheme (MCS) associated with transmitting Bluetooth-encoded audio frames over the WLAN link, an increase in a packet error rate (PER) associated with the WLAN link, an increase in latencies associated with transmission of the Bluetooth-encoded audio frames over the WLAN link, or an increase in a number of retransmission attempts of one or more Bluetooth-encoded audio frames over the WLAN link.

In some instances, the WLAN link may include one or more wireless channels in a sub-GHz frequency band, a 2.4 GHz frequency band, a 5 GHz frequency band, or a 6 GHz frequency band. In other instances, the WLAN link may include at least one of a peer-to-peer (P2P) link, a tunneled direct-link setup (TDLS) link, a Wi-Fi Direct link, a link associated with a Group Owner (GO), or a link associated with a Neighborhood Area Network (NAN).

Figure 10:
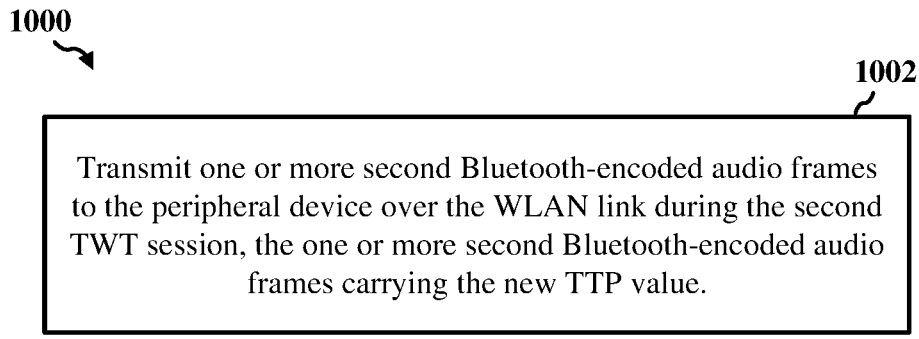

FIG. 10 shows a flowchart illustrating another example operation 1000 for wireless communication that supports a wireless device and a peripheral device renegotiating TWT parameters, according to various aspects of the present disclosure. The operation 1000 may be performed by a wireless device such as the central device 102 of FIG. 1, the wireless device 200 of FIG. 2, the wireless device 610 of FIG. 6, or the wireless device 700 of FIG. 7, or the wireless device described with reference to FIG. 9. In some instances, the peripheral device may be an example of one or more of the peripheral devices 104, 106, 108, 110, 112, or 114 of FIG. 1, the earbuds 420 of FIGS. 4A-4B, the earbuds 520 of FIGS. 5A-5B, the peripheral device 620 of FIGS. 6 and 7, or the peripheral device described with reference to FIG. 9.

In some instances, the operation 1000 may be performed after the operation 900 of FIG. 9. For example, at 1002, the wireless device transmits one or more second Bluetooth-encoded audio frames to the peripheral device over the WLAN link during the second TWT session, the one or more second Bluetooth-encoded audio frames carrying the new TTP value. In this way, the wireless device may resume transmission of the audio stream to the peripheral device without interruption of the audio stream by including the new TTP value in the Bluetooth-encoded audio frames. In some aspects, the new TTP value may be based at least in part on a size of, or available space in, a receive buffer responsible for buffering audio data received by the peripheral device from the wireless device.

Figure 11:
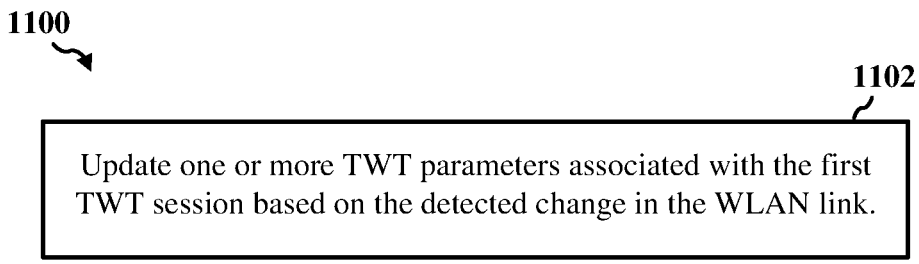

FIG. 11 shows a flowchart illustrating another example operation 1100 for wireless communication that supports a wireless device and a peripheral device renegotiating TWT parameters, according to various aspects of the present disclosure. The operation 1100 may be performed by a wireless device such as the central device 102 of FIG. 1, the wireless device 200 of FIG. 2, the wireless device 610 of FIG. 6, the wireless device 700 of FIG. 7, or the wireless device described with reference to FIG. 9. In some instances, the peripheral device may be an example of one or more of the peripheral devices 104, 106, 108, 110, 112, or 114 of FIG. 1, the earbuds 420 of FIGS. 4A-4B, the earbuds 520 of FIGS. 5A-5B, the peripheral device 620 of FIGS. 6 and 7, or the peripheral device described with reference to FIG. 9.

In some instances, the operation 1100 may be one example of obtaining the one or more new TWT parameters, for example, at 908 of FIG. 9. For example, at 1102, the wireless device updates one or more TWT parameters associated with the first TWT session based on the detected change in the WLAN link. In some instances, wireless device may update the TWT parameters based on one or more of a degradation of channel conditions on the WLAN link, a decrease in a channel quality indicator (QCI) of the WLAN link, a decrease in a modulation and coding scheme (MCS) associated with transmitting Bluetooth-encoded audio frames over the WLAN link, an increase in a packet error rate (PER) associated with the WLAN link, an increase in latencies associated with transmission of the Bluetooth-encoded audio frames over the WLAN link, or an increase in a number of retransmission attempts of one or more Bluetooth-encoded audio frames over the WLAN link. The updated TWT parameters may be used as the new TWT parameters for the new TWT session on the WLAN link between the wireless device and the peripheral device.

Figure 12:
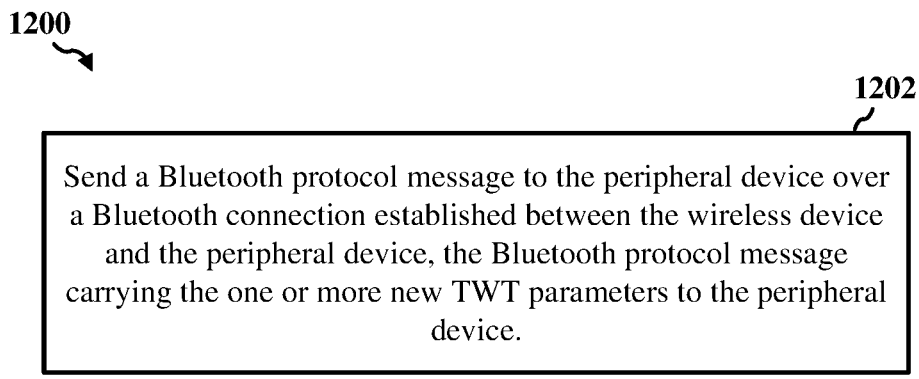

FIG. 12 shows a flowchart illustrating another example operation 1200 for wireless communication that supports a wireless device and a peripheral device renegotiating TWT parameters, according to various aspects of the present disclosure. The operation 1200 may be performed by a wireless device such as the central device 102 of FIG. 1, the wireless device 200 of FIG. 2, the wireless device 610 of FIG. 6, the wireless device 700 of FIG. 7, or the wireless device described with reference to FIG. 9. In some instances, the peripheral device may be an example of one or more of the peripheral devices 104, 106, 108, 110, 112, or 114 of FIG. 1, the earbuds 420 of FIGS. 4A-4B, the earbuds 520 of FIGS. 5A-5B, the peripheral device 620 of FIGS. 6 and 7, or the peripheral device described with reference to FIG. 9.

In some instances, the operation 1200 may be one example of indicating the new TWT parameters to the peripheral device, for example, at 910 of FIG. 9. For example, at 1202, the wireless device sends a Bluetooth protocol message to the peripheral device over a Bluetooth connection established between the wireless device and the peripheral device, the Bluetooth protocol message carrying the one or more new TWT parameters to the peripheral device. In this way, the wireless device may use the Bluetooth connection as a side-link control channel over which the new TWT parameters (and other information) may be provided to the peripheral device.

Figure 13:
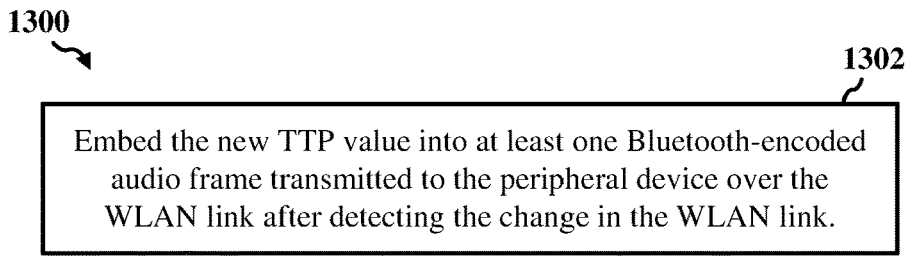

FIG. 13 shows a flowchart illustrating another example operation 1300 for wireless communication that supports a wireless device and a peripheral device renegotiating TWT parameters, according to various aspects of the present disclosure. The operation 1300 may be performed by a wireless device such as the central device 102 of FIG. 1, the wireless device 200 of FIG. 2, the wireless device 610 of FIG. 6, the wireless device 700 of FIG. 7, or the wireless device described with reference to FIG. 9. In some instances, the peripheral device may be an example of one or more of the peripheral devices 104, 106, 108, 110, 112, or 114 of FIG. 1, the earbuds 420 of FIGS. 4A-4B, the earbuds 520 of FIGS. 5A-5B, the peripheral device 620 of FIGS. 6 and 7, or the peripheral device described with reference to FIG. 9.

In some instances, the operation 1300 may be one example of indicating the new TTP value to the peripheral device, at 910 of FIG. 9. For example, at 1302, the wireless device embeds the new TTP value into at least one Bluetooth-encoded audio frame transmitted to the peripheral device over the WLAN link after detecting the change in the WLAN link. The peripheral device may receive the at least one Bluetooth-encoded audio frame, and may update its TTP value with the new TTP value embedded in the at least one Bluetooth-encoded audio frame.

Figure 14:
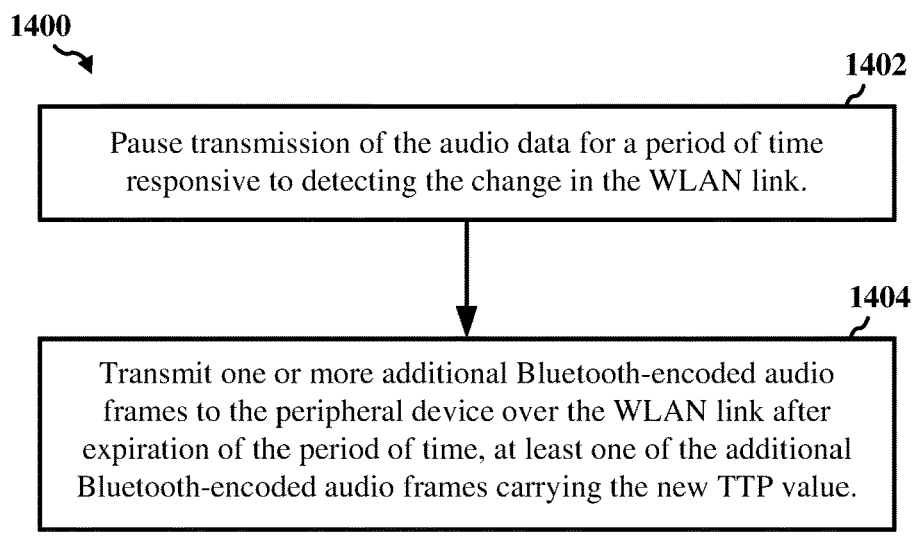

FIG. 14 shows a flowchart illustrating another example operation 1400 for wireless communication that supports a wireless device and a peripheral device renegotiating TWT parameters, according to various aspects of the present disclosure. The operation 1400 may be performed by a wireless device such as the central device 102 of FIG. 1, the wireless device 200 of FIG. 2, the wireless device 610 of FIG. 6, the wireless device 700 of FIG. 7, or the wireless device described with reference to FIG. 9. In some instances, the peripheral device may be an example of one or more of the peripheral devices 104, 106, 108, 110, 112, or 114 of FIG. 1, the earbuds 420 of FIGS. 4A-4B, the earbuds 520 of FIGS. 5A-5B, the peripheral device 620 of FIGS. 6 and 7, or the peripheral device described with reference to FIG. 9.

In some instances, the operation 1400 may be one example of indicating the new TTP value to the peripheral device, at 910 of FIG. 9. For example, at 1402, the wireless device pauses transmission of the audio data for a period of time responsive to detecting the change in the WLAN link. At 1404, the wireless device transmits one or more additional Bluetooth-encoded audio frames to the peripheral device over the WLAN link after expiration of the period of time, at least one of the additional Bluetooth-encoded audio frames carrying the new TTP value. In some instances, the one or more additional Bluetooth-encoded audio frames may be transmitted to the peripheral device during the first TWT session. In this way, the peripheral device can update its TTP value with the new TTP value during the first TWT session, thereby synchronizing the TTP values used by the peripheral device with the TTP values used by the wireless device prior to the start of the second TWT session between the wireless device and the peripheral device.

Figure 15:
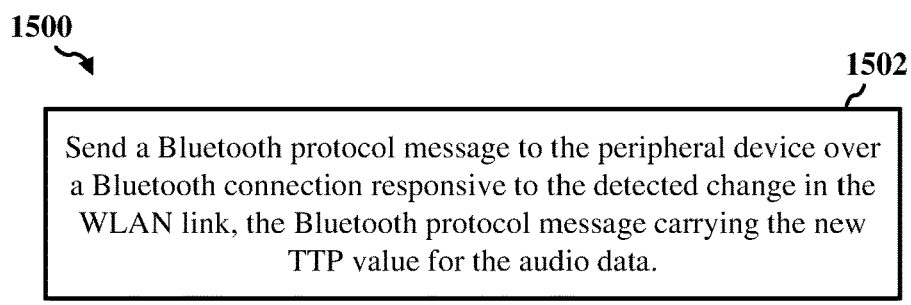

FIG. 15 shows a flowchart illustrating another example operation 1500 for wireless communication that supports a wireless device and a peripheral device renegotiating TWT parameters, according to various aspects of the present disclosure. The operation 1500 may be performed by a wireless device such as the central device 102 of FIG. 1, the wireless device 200 of FIG. 2, the wireless device 610 of FIG. 6, the wireless device 700 of FIG. 7, or the wireless device described with reference to FIG. 9. In some instances, the peripheral device may be an example of one or more of the peripheral devices 104, 106, 108, 110, 112, or 114 of FIG. 1, the earbuds 420 of FIGS. 4A-4B, the earbuds 520 of FIGS. 5A-5B, the peripheral device 620 of FIGS. 6 and 7, or the peripheral device described with reference to FIG. 9.

In some instances, the operation 1500 may be one example of indicating the new TTP value to the peripheral device, for example, at 910 of FIG. 9. For example, at 1502, the wireless device sends a Bluetooth protocol message to the peripheral device over a Bluetooth connection responsive to the detected change in the WLAN link, the Bluetooth protocol message carrying the new TTP value for the audio data. In this way, the wireless device may use the Bluetooth connection as a side-link control channel over which the new TTP value (and other information) may be provided to the peripheral device.

Figure 16:
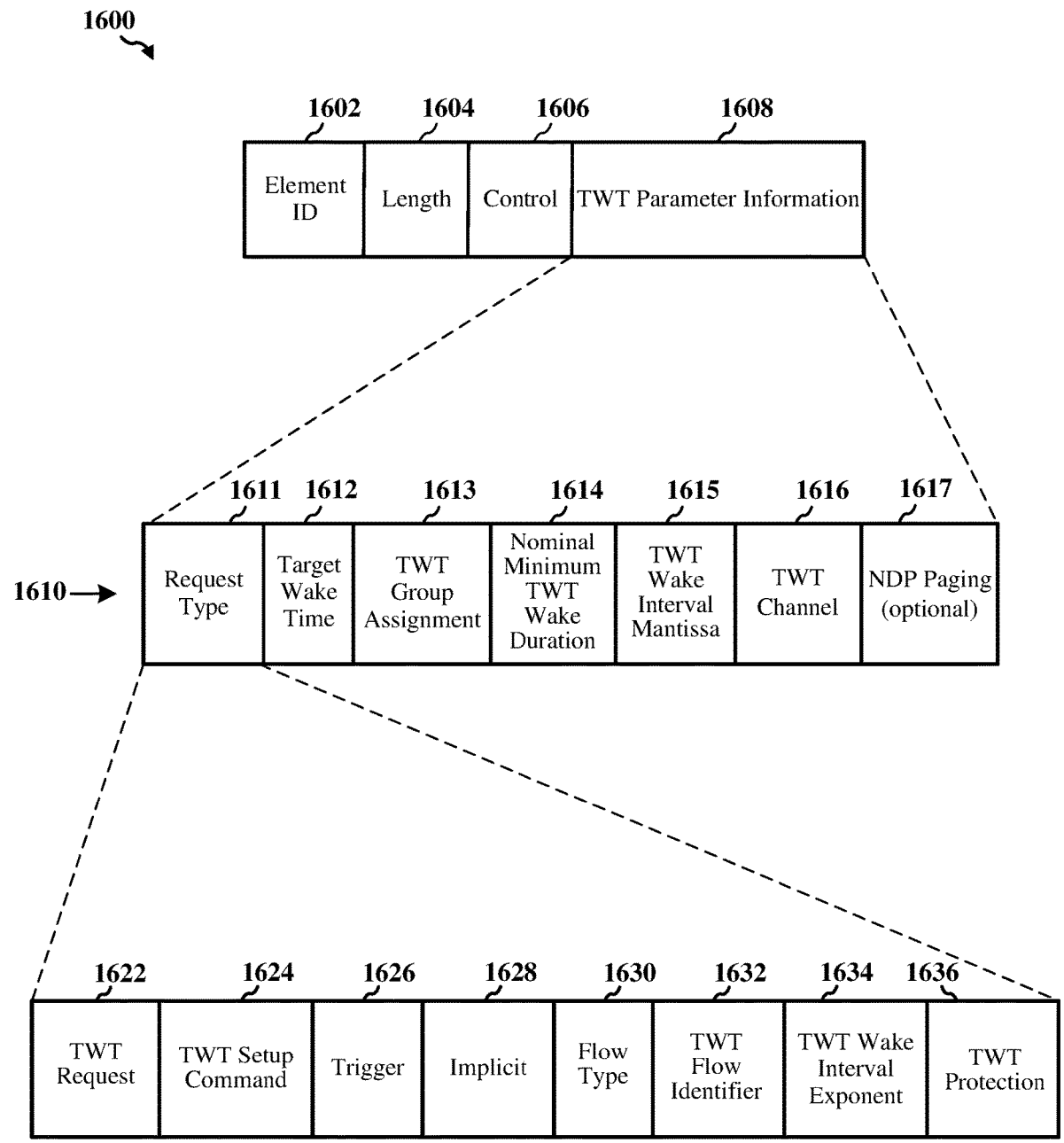
FIG. 16 shows an example TWT Element usable for wireless communications that support renegotiating TWT parameters.

FIG. 16 shows an example TWT Element 1600 usable for wireless communications that support renegotiating TWT parameters. The TWT Element 1600 may include an element ID field 1602, a length field 1604, a control field 1606, and a TWT parameter information field 1608. The element ID field 1602 indicates that the element is a TWT Element. The length field 1604 indicates a length of the TWT Element 1600. The control field 1606 includes various control information for a restricted TWT session advertised by the TWT Element 1600. The TWT parameter information field 1608 contains either a single individual TWT Parameter Set field or one or more Broadcast TWT Parameter Set fields. In some instances, the TWT Element 1600 may be used in one or both of the TWT request frame or the TWT response frame of FIGS. 8A-8B.

As shown, the TWT Parameter Information field 1608 carries an Individual TWT Parameter Set field 1610 including a Request Type field 1611, a Target Wake Time field 1612, a TWT Group Assignment field 1613, a Nominal Minimum TWT Wake Duration field 1614, a TWT Wake Interval Mantissa field 1615, a TWT Channel field 1616, and an optional NDP Paging field 1617. The Request Type field 1611 indicates a type of TWT session requested. The Target Wake Time field 1612 carries an unsigned integer corresponding to a TSF time at which the STA requests to wake. The TWT Group Assignment field 1613. The Nominal Minimum TWT Wake Duration field 1614 indicates the minimum amount of time that the TWT requesting STA or TWT scheduled STA is expected remain in an awake state or mode. The TWT Wake Interval Mantissa field 1615 may be set to a non-zero value a periodic TWT and a zero value for an aperiodic TWT. The TWT Channel field 1616 indicates the wireless channel on which a corresponding TWT operation is established or scheduled. The NDP Paging subfield 1617 may be used in conjunction with the Request Type field 1611 to indicate NDP paging.

As shown, the Request Type field 1610 includes a TWT Request subfield 1622, a TWT Setup Command subfield 1624, a Trigger subfield 1626, an Implicit subfield 1628, a Flow Type subfield 1630, a TWT Flow Identifier subfield 1632, a TWT Wake Interval Exponent subfield 1634, and a TWT Protection subfield 1636. The TWT Request subfield 1622 may carry a value indicating whether the corresponding TWT Information Element was transmitted by a scheduled STA or by a scheduling STA. The TWT Setup Command subfield 1624 may carry values that indicate the type of TWT commands carried in the TWT Information Element. The Trigger subfield 1626 indicates whether or not the TWT SP indicated by the TWT Element 1600 includes triggering frames. For example, the Trigger subfield 1626 is set to 1 to indicate that at least one triggering frame is transmitted during the TWT SP, and is otherwise set to 0.

The Implicit subfield 1628 is set to 1 to indicate an implicit TWT operation, and is set to 0 to indicate an explicit TWT operation. The Flow Type subfield 1630 indicates the type of interaction between the TWT requesting STA or TWT scheduled STA and the TWT responding STA or TWT scheduling AP at a TWT. For example, setting the Flow Type subfield 1630 to a value of 0 indicates an announced TWT in which the TWT requesting STA or the TWT scheduled STA sends a PS-Poll or an APSD trigger frame to signal its awake state. Setting the Flow Type subfield 1630 to a value of 1 indicates an unannounced TWT in which the TWT responding STA or TWT scheduling AP will send a frame to the TWT requesting STA or TWT scheduled STA at TWT without waiting to receive a PS-Poll or an APSD trigger frame.

The TWT Flow Identifier subfield 1632 contains a 3-bit value that identifies the specific information for this TWT request uniquely from other requests made between the same TWT requesting STA and the TWT responding STA pair. The TWT Wake Interval Exponent subfield 1634 carries a value from which the TWT wake interval can be obtained. In some instances, the TWT Wake Interval Exponent subfield 1634 is set to the value of the exponent of the TWT Wake Interval value in microseconds, base 2. The TWT Protection subfield 1636 indicates whether or not the TWT requesting STA requested the TWT responding STA to provide protection of the set of TWT SPs corresponding to the value carried in the TWT Flow Identifier subfield 1632.

Figure 17:
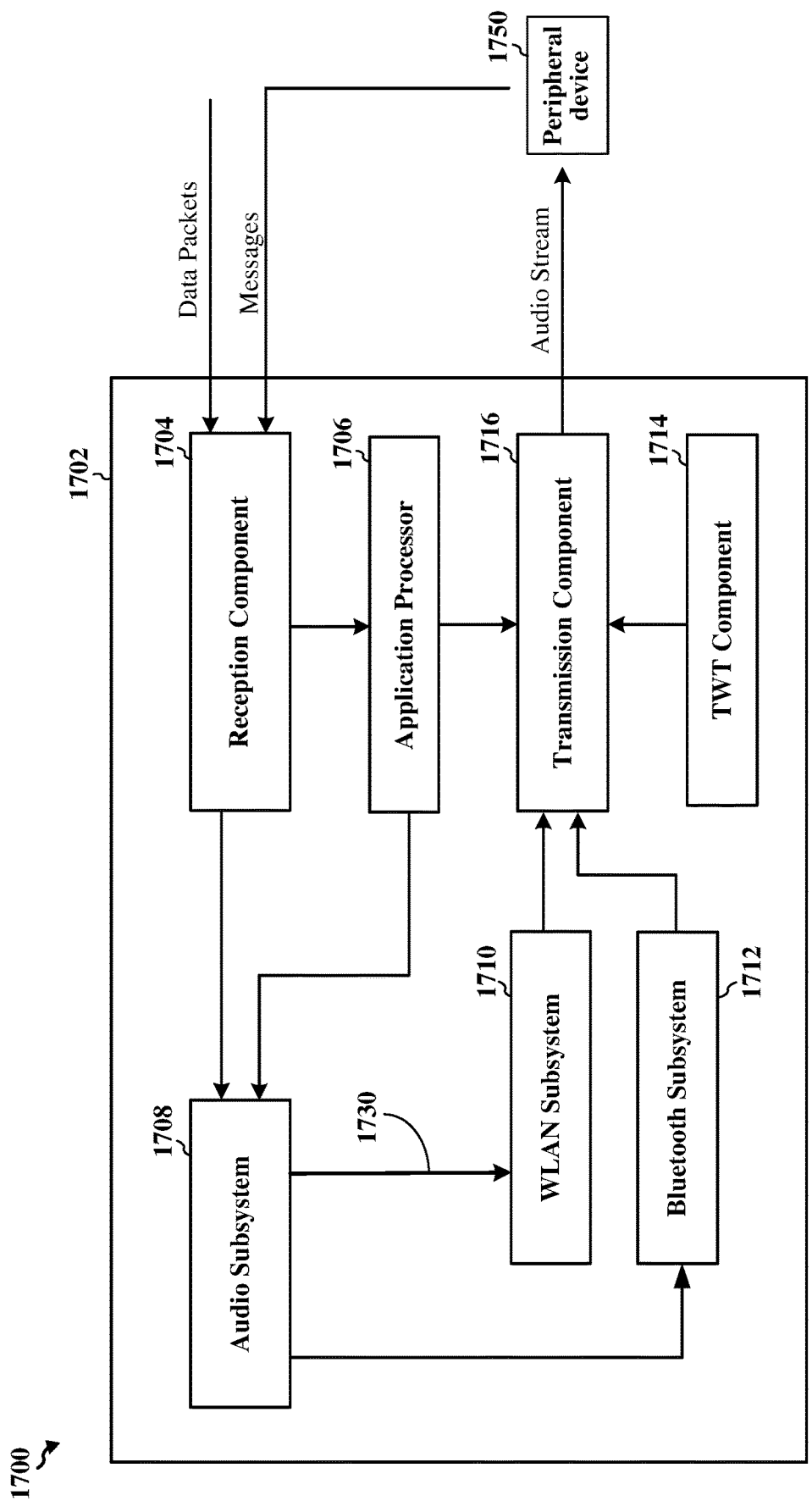
FIG. 17 shows a conceptual data flow diagram illustrating the data flow between different means/components in an example apparatus.

FIG. 17 is a conceptual data flow diagram 1700 illustrating the data flow between different means and/or components of an example apparatus 1702. In some implementations, the apparatus 1702 may be a wireless device that operates as a STA associated with a WLAN while also operating as a softAP associated with a peripheral device 1750. The apparatus 1702 includes a reception component 1704 that receives data packets from another wireless communication device (such as an AP associated with the WLAN). The apparatus 1702 also includes an application processor 1706, an audio subsystem 1708, a WLAN subsystem 1710, a Bluetooth subsystem 1712, a TWT component 1714, and a transmission component 1716.

The application processor 1706 extracts audio data from received data packets, attaches or applies a Bluetooth profile to the extracted audio data, and routes the extracted audio data to the audio subsystem 1708. The audio subsystem 1708 encodes the audio data, and routes the encoded audio data to the WLAN subsystem 1710 via a direct link 1730. As discussed, the direct link 1730 allows the encoded audio data to be routed directly to the WLAN subsystem 1710 without going through the application processor 1706 and without accessing the TCP/IP stack within or associated with the application processor 1706, thereby avoiding latencies associated with the application processor 1706 and the TCP/IP stack, respectively. The WLAN subsystem 1710 embeds the Bluetooth-encoded audio frames into one or more IEEE 802.11-compliant data packets such as PPDUs.

The Bluetooth subsystem 1712 can establish a Bluetooth session or connection with the peripheral device 1750, and can facilitate the transmission of data and other information to the peripheral device 1750 using Bluetooth communications (e.g., as one or more Bluetooth frames or packets). For example, in some instances, the apparatus 1702 may send new TTP values to the peripheral device 1750 over the Bluetooth connection in one or more Bluetooth messages. In other instances, the apparatus 1702 may send new TWT parameters to the peripheral device 1750 over the Bluetooth connection in one or more Bluetooth messages.

The TWT component 1714 may be used by the apparatus 1702 to establish one or more TWT sessions with the peripheral device 1750 over the WLAN link. In some instances, the TWT component 1714 may be used by the apparatus 1702 to determine or obtain one or more new TWT parameters based on detected changes in the WLAN link. As discussed, the detected changes in the WLAN link may include one or more of a degradation of channel conditions on the WLAN link, a decrease in a channel quality indicator (QCI) of the WLAN link, a decrease in a modulation and coding scheme (MCS) associated with transmitting Bluetooth-encoded audio frames over the WLAN link, an increase in a packet error rate (PER) associated with the WLAN link, an increase in latencies associated with transmission of the Bluetooth-encoded audio frames over the WLAN link, or an increase in a number of retransmission attempts of one or more Bluetooth-encoded audio frames over the WLAN link.

The transmission component 1716 is coupled to the WLAN subsystem 1710 and the Bluetooth subsystem 1712, may be used to transmit frames or packets provided by the WLAN subsystem 1710 and/or the Bluetooth subsystem 1712 to other wireless communication devices. Specifically, the transmission component 1716 may be used to transmit WLAN frames or packets provided by the WLAN subsystem 1710 to the peripheral device 1750 over one or more WLAN channels, and may be used to transmit Bluetooth-encoded audio frames provided by the Bluetooth subsystem 1712 to the peripheral device 1750 over the Bluetooth connection. In some implementations, the transmission component 1716 may be used to transmit Bluetooth-encoded audio frames encapsulated within one or more WLAN-compliant PPDUs to the peripheral device 1750 over the WLAN link. In some instances, various aspects of the transmission component 1716 may be integrated within each of the WLAN subsystem 1710 and the Bluetooth subsystem 1712.

The apparatus 1702 may include additional components that perform each of the operations in the flowcharts of FIGS. 9-15. As such, each block in the flowcharts of FIGS. 9-15 may be performed by a component, and the apparatus 1702 may include one or more of those components. The components may be one or more hardware components specifically configured to conduct the stated processes/algorithm, implemented by a processor configured to perform the stated processes/algorithm, stored within a computer-readable medium for implementation by a processor, or some combination thereof.

Figure 18:
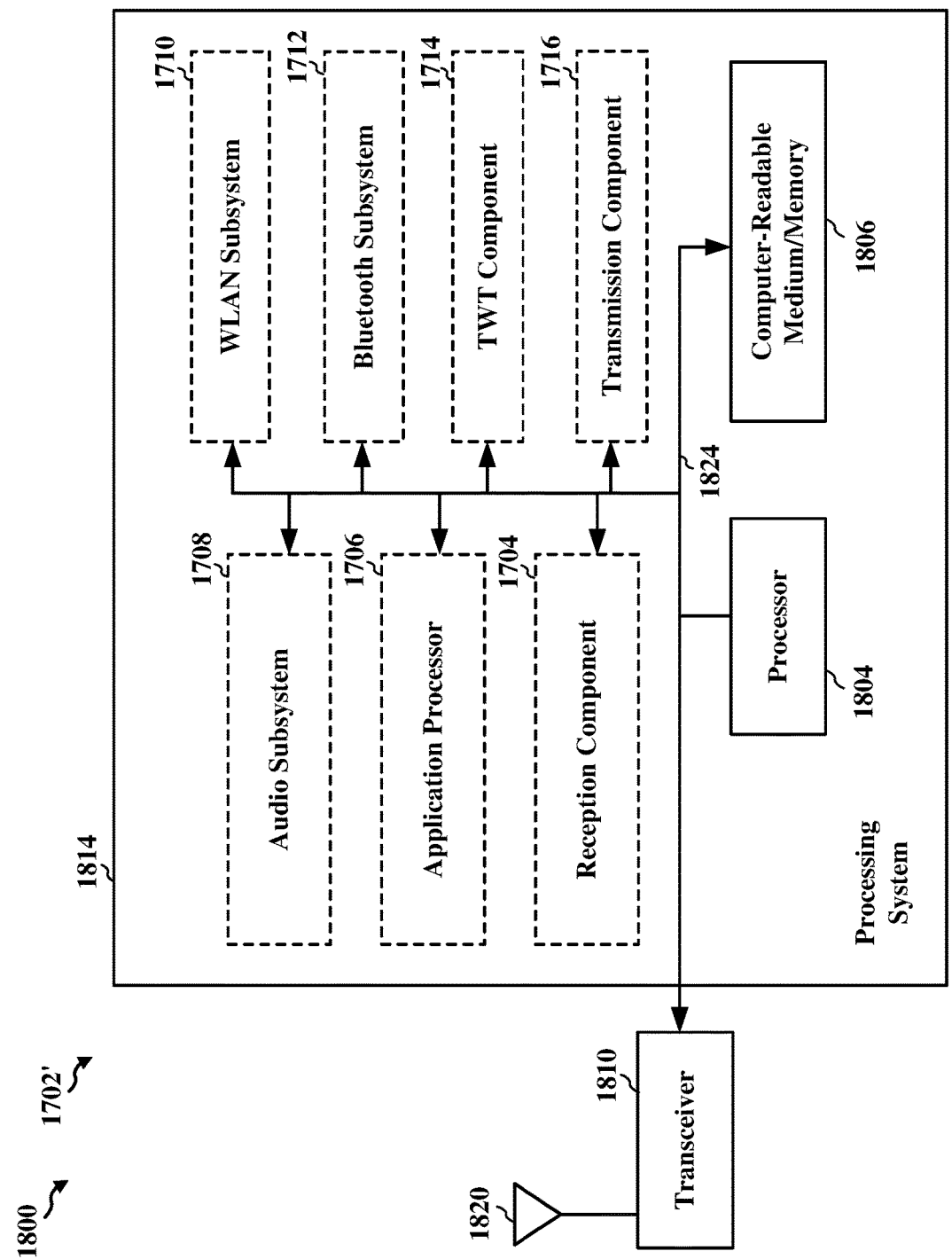
FIG. 18 shows a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712, 1714, and 1716 and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1716, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712, 1714, and 1716. The components may be software components running in the processor 1804, resident/stored in the computer readable medium/memory 1806, one or more hardware components coupled to the processor 1804, or some combination thereof.

In certain configurations, the apparatus 1702/1702' for wireless communication may include means for all means limitations described herein. The aforementioned means may be the processor(s) 202, the radio 230, the MMU 240, the WLAN controller 250, the Bluetooth controller 252, the WWAN controller 256, one or more of the aforementioned components of the apparatus 1702 and/or the processing system 1814 of the apparatus 1702' configured to perform the functions recited by the aforementioned means.

In one configuration, the apparatus 1702/1702' for wireless communication includes means for operating the wireless device as a wireless station (STA) associated with a WLAN while also operating as a softAP paired with a peripheral device based on a Bluetooth protocol, the peripheral device associated with the softAP via a WLAN link. The apparatus 1702/1702' for wireless communication may also include means for transmitting one or more first Bluetooth-encoded audio frames to the peripheral device over the WLAN link during a first TWT session on the WLAN link, the one or more first Bluetooth-encoded audio frames indicating a current TTP value for audio data. The apparatus 1702/1702' for wireless communication may also include means for detecting a change in the WLAN link, and means for obtaining one or more new TWT parameters and a new TTP value responsive to detecting the change in the WLAN link, the new TTP value being greater than the current TTP value. The apparatus 1702/1702' for wireless communication may also include means for indicating the one or more new TWT parameters and the new TTP value to the peripheral device in conjunction with tearing down the first TWT session, and means for establishing a second TWT session on the WLAN link with the peripheral device based at least in part on the one or more new TWT parameters. The aforementioned means may be one or more of the aforementioned components of the apparatus 1802 and/or the processing system 1814 of the apparatus 1702' configured to perform the functions recited by the aforementioned means. As described supra, the processing system 1814 may include the processors 202, the memory 206, the flash memory 210, and/or the ROM 208 of FIG. 2.

Implementation examples are described in the following numbered clauses:

1. A method of wireless communication by a wireless device, the method including:
   operating the wireless device as a wireless station (STA) associated with a wireless local area network (WLAN) while also operating as a software-enabled access point (softAP) paired with a peripheral device based on a Bluetooth protocol, the peripheral device associated with the softAP via a WLAN link;
   transmitting one or more first Bluetooth-encoded audio frames to the peripheral device over the WLAN link during a first target wake time (TWT) session on the WLAN link, the one or more first Bluetooth-encoded audio frames indicating a current time-to-play (TTP) value for audio data;
   detecting a change in the WLAN link;
   obtaining one or more new TWT parameters and a new TTP value responsive to detecting the change in the WLAN link, the new TTP value being greater than the current TTP value;
   indicating the one or more new TWT parameters and the new TTP value to the peripheral device in conjunction with tearing down the first TWT session;
   and establishing a second TWT session on the WLAN link with the peripheral device based at least in part on the one or more new TWT parameters.
2. The method of clause 1, further including:
   transmitting one or more second Bluetooth-encoded audio frames to the peripheral device over the WLAN link during the second TWT session, the one or more second Bluetooth-encoded audio frames carrying the new TTP value.
3. The method of clause 2, where the new TTP value is based at least in part on a size of a buffer associated with buffering the one or more second Bluetooth-encoded audio frames in the peripheral device.
4. The method of any one or more of clauses 1-3, where a time period between a first time indicated by the current TTP value and a second time indicated by the new TTP value is based at least in part on a duration of time associated with establishing the second TWT session.
5. The method of clause 4, where the time period is approximately 250 milliseconds.
6. The method of any one or more of clauses 1-5, where indicating the new TWT parameters to the peripheral device includes:
   sending a Bluetooth protocol message to the peripheral device over a Bluetooth connection established between the wireless device and the peripheral device, the Bluetooth protocol message carrying the one or more new TWT parameters to the peripheral device.
7. The method of any one or more of clauses 1-6, where the one or more new TWT parameters include at least one of a TWT wake duration, a TWT wake interval, a TWT wake time, a minimum data rate, a mean data rate, a delay bound, or a user priority (UP) for the TWT session.
8. The method of any one or more of clauses 1-7, where obtaining the one or more new TWT parameters includes:
   updating one or more TWT parameters associated with the first TWT session based on the detected change in the WLAN link.
9. The method of any one or more of clauses 1-8, where the detected change includes one or more of a degradation of channel conditions on the WLAN link, a decrease in a channel quality indicator (QCI) of the WLAN link, a decrease in a modulation and coding scheme (MCS) associated with transmitting Bluetooth-encoded audio frames over the WLAN link, an increase in a packet error rate (PER) associated with the WLAN link, an increase in latencies associated with transmission of the Bluetooth-encoded audio frames over the WLAN link, or an increase in a number of retransmission attempts of one or more Bluetooth-encoded audio frames over the WLAN link.
10. The method of any one or more of clauses 1-9, where indicating the new TTP value to the peripheral device includes:
    embedding the new TTP value into at least one Bluetooth-encoded audio frame transmitted to the peripheral device over the WLAN link after detecting the change in the WLAN link.
11. The method of any one or more of clauses 1-9, where indicating the new TTP value to the peripheral device includes:
    pausing transmission of the audio data for a period of time responsive to detecting the change in the WLAN link; and
    transmitting one or more additional Bluetooth-encoded audio frames to the peripheral device over the WLAN link after expiration of the period of time, at least one of the additional Bluetooth-encoded audio frames carrying the new TTP value.
12. The method of any one or more of clauses 1-9, where indicating the new TTP value to the peripheral device includes:
    sending a Bluetooth protocol message to the peripheral device over a Bluetooth connection responsive to the detected change in the WLAN link, the Bluetooth protocol message carrying the new TTP value for the audio data.
13. The method of any one or more of clauses 1-12, where the WLAN link includes one or more wireless channels in a sub-GHz frequency band, a 2.4 GHz frequency band, a 5 GHz frequency band, or a 6 GHz frequency band.
14. The method of any one or more of clauses 1-13, where the peripheral device includes a first earbud and a second earbud, each of the first earbud and the second earbud being associated with the softAP, and each of the first earbud and the second earbud being paired with the softAP via the Bluetooth connection.
15. A wireless device, including:
    one or more processors; and
    a memory coupled to the one or more processors and storing processor-readable code that, when executed by the one or more processors, is configured to:
    operate the wireless device as a wireless station (STA) associated with a wireless local area network (WLAN) while also operating as a software-enabled access point (softAP) paired with a peripheral device based on a Bluetooth protocol, the peripheral device associated with the softAP via a WLAN link;

transmitting one or more first Bluetooth-encoded audio frames to the peripheral device over the WLAN link during a first target wake time (TWT) session on the WLAN link, the one or more first Bluetooth-encoded audio frames indicating a current time-to-play (TTP) value for audio data;

detect a change in the WLAN link;

obtain one or more new TWT parameters and a new TTP value responsive to detecting the change in the WLAN link, the new TTP value being greater than the current TTP value;

indicate the one or more new TWT parameters and the new TTP value to the peripheral device in conjunction with tearing down the first TWT session; and establish a second TWT session on the WLAN link with the peripheral device based at least in part on the one or more new TWT parameters.

16. The wireless device of clause 15, where execution of the processor-readable code is further configured to:

transmit one or more second Bluetooth-encoded audio frames to the peripheral device over the WLAN link during the second TWT session, the one or more second Bluetooth-encoded audio frames carrying the new TTP value.

17. The wireless device of clause 16, where the new TTP value is based at least in part on a size of a buffer associated with buffering the one or more second Bluetooth-encoded audio frames in the peripheral device.

18. The wireless device of any one or more of clauses 15-17, where a time period between a first time indicated by the current TTP value and a second time indicated by the new TTP value is based at least in part on a duration of time associated with establishing the second TWT session.

19. The wireless device of clause 18, where the time period is approximately 250 milliseconds.

20. The wireless device of any one or more of clauses 15-19, where execution of the processor-readable code to indicate the new TWT parameters is configured to:

send a Bluetooth protocol message to the peripheral device over a Bluetooth connection established between the wireless device and the peripheral device, the Bluetooth protocol message carrying the one or more new TWT parameters to the peripheral device.

21. The wireless device of any one or more of clauses 15-20, where the one or more new TWT parameters include at least one of a TWT wake duration, a TWT wake interval, a TWT wake time, a minimum data rate, a mean data rate, a delay bound, or a user priority (UP) for the TWT session.

22. The wireless device of any one or more of clauses 15-21, where execution of the processor-readable code to obtain the one or more new TWT parameters is configured to:

update one or more TWT parameters associated with the first TWT session based on the detected change in the WLAN link.

23. The wireless device of any one or more of clauses 15-22, where the detected change includes one or more of a degradation of channel conditions on the WLAN link, a decrease in a channel quality indicator (QCI) of the WLAN link, a decrease in a modulation and coding scheme (MCS) associated with transmitting Bluetooth-encoded audio frames over the WLAN link, an increase in a packet error rate (PER) associated with the WLAN link, an increase in latencies associated with transmission of the Bluetooth-encoded audio frames over the WLAN link, or an increase in a number of retransmission attempts of one or more Bluetooth-encoded audio frames over the WLAN link.

24. The wireless device of any one or more of clauses 15-23, where execution of the processor-readable code to indicate the new TTP value is configured to:

embed the new TTP value into at least one Bluetooth-encoded audio frame transmitted to the peripheral device over the WLAN link after detecting the change in the WLAN link.

25. The wireless device of any one or more of clauses 15-23, where execution of the processor-readable code to indicate the new TTP value is configured to:

pause transmission of the audio data for a period of time responsive to detecting the change in the WLAN link; and transmit one or more additional Bluetooth-encoded audio frames to the peripheral device over the WLAN link after expiration of the period of time, at least one of the additional Bluetooth-encoded audio frames carrying the new TTP value.

26. The wireless device of any one or more of clauses 15-23, where execution of the processor-readable code to indicate the new TTP value is configured to:

send a Bluetooth protocol message to the peripheral device over a Bluetooth connection responsive to the detected change in the WLAN link, the Bluetooth protocol message carrying the new TTP value for the audio data.

27. The wireless device of any one or more of clauses 15-26, where the WLAN link includes one or more wireless channels in a sub-GHz frequency band, a 2.4 GHz frequency band, a 5 GHz frequency band, or a 6 GHz frequency band.

28. The wireless device of any one or more of clauses 15-27, where the peripheral device includes a first earbud and a second earbud, each of the first earbud and the second earbud being associated with the softAP, and each of the first earbud and the second earbud being paired with the softAP via the Bluetooth connection.

29. A wireless device, including:

means for operating the wireless device as a wireless station (STA) associated with a wireless local area network (WLAN) while also operating as a software-enabled access point (softAP) paired with a peripheral device based on a Bluetooth protocol, the peripheral device associated with the softAP via a WLAN link;

means for transmitting one or more first Bluetooth-encoded audio frames to the peripheral device over the WLAN link during a first target wake time (TWT) session on the WLAN link, the one or more first Bluetooth-encoded audio frames indicating a current time-to-play (TTP) value for audio data;

means for detecting a change in the WLAN link;

means for obtaining one or more new TWT parameters and a new TTP value responsive to detecting the change in the WLAN link, the new TTP value being greater than the current TTP value;

means for indicating the one or more new TWT parameters and the new TTP value to the peripheral device in conjunction with tearing down the first TWT session; and means for establishing a second TWT session on the WLAN link with the peripheral device based at least in part on the one or more new TWT parameters.

30. A non-transitory computer-readable storage medium storing processor-readable code that, when executed by one or more processors of a wireless device, causes the wireless device to perform operations including:
operating the wireless device as a wireless station (STA) associated with a wireless local area network (WLAN) while also operating as a software-enabled access point (softAP) paired with a peripheral device based on a Bluetooth protocol, the peripheral device associated with the softAP via a WLAN link;
transmitting one or more first Bluetooth-encoded audio frames to the peripheral device over the WLAN link during a first target wake time (TWT) session on the WLAN link, the one or more first Bluetooth-encoded audio frames indicating a current time-to-play (TTP) value for audio data;
detecting a change in the WLAN link;
obtaining one or more new TWT parameters and a new TTP value responsive to detecting the change in the WLAN link, the new TTP value being greater than the current TTP value;
indicating the one or more new TWT parameters and the new TTP value to the peripheral device in conjunction with tearing down the first TWT session; and
establishing a second TWT session on the WLAN link with the peripheral device based at least in part on the one or more new TWT parameters.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A method of wireless communication by a wireless device, the method comprising:
operating the wireless device as a wireless station (STA) associated with a wireless local area network (WLAN) while also operating as a software-enabled access point (softAP) paired with a peripheral device based on a Bluetooth protocol, the peripheral device associated with the softAP via a WLAN link;
transmitting one or more first Bluetooth-encoded audio frames to the peripheral device over the WLAN link during a first target wake time (TWT) session on the WLAN link, the one or more first Bluetooth-encoded audio frames indicating a current time-to-play (TTP) value for audio data, the current TTP value indicating a first instance in time at which the audio data is to be played;
detecting a degradation of the WLAN link;
obtaining one or more new TWT parameters and a new TTP value responsive to detecting the degradation of the WLAN link, the new TTP value being greater than the current TTP value, the new TTP value indicating a second instance in time at which the audio data is to be played;
indicating the one or more new TWT parameters and the new TTP value to the peripheral device in conjunction with tearing down the first TWT session; and
establishing a second TWT session on the WLAN link with the peripheral device based at least in part on the one or more new TWT parameters.

2. The method of claim 1, further comprising:
transmitting one or more second Bluetooth-encoded audio frames to the peripheral device over the WLAN link during the second TWT session, the one or more second Bluetooth-encoded audio frames carrying the new TTP value.

3. The method of claim 2, wherein the new TTP value is based at least in part on a size of a buffer associated with buffering the one or more second Bluetooth-encoded audio frames in the peripheral device.

4. The method of claim 1, wherein a time period between the first instance in time indicated by the current TTP value and the second instance in time indicated by the new TTP value is based at least in part on a duration of time associated with establishing the second TWT session.

5. The method of claim 4, wherein the time period is approximately 250 milliseconds.

6. The method of claim 1, wherein indicating the new TWT parameters to the peripheral device includes:
sending a Bluetooth protocol message to the peripheral device over a Bluetooth connection established between the wireless device and the peripheral device, the Bluetooth protocol message carrying the one or more new TWT parameters to the peripheral device.

7. The method of claim 1, wherein the one or more new TWT parameters include at least one of a TWT wake duration, a TWT wake interval, a TWT wake time, a minimum data rate, a mean data rate, a delay bound, or a user priority (UP) for the TWT session.

8. The method of claim 1, wherein obtaining the one or more new TWT parameters includes:
updating one or more TWT parameters associated with the first TWT session based on the detected degradation of the WLAN link.

9. The method of claim 1, wherein the detected degradation includes one or more of a degradation of channel conditions on the WLAN link, a decrease in a channel quality indicator (QCI) of the WLAN link, a decrease in a modulation and coding scheme (MCS) associated with transmitting Bluetooth-encoded audio frames over the WLAN link, an increase in a packet error rate (PER) associated with the WLAN link, an increase in latencies associated with transmission of the Bluetooth-encoded audio frames over the WLAN link, or an increase in a number of retransmission attempts of one or more Bluetooth-encoded audio frames over the WLAN link.

10. The method of claim 1, wherein indicating the new TTP value to the peripheral device includes:
embedding the new TTP value into at least one Bluetooth-encoded audio frame transmitted to the peripheral device over the WLAN link after detecting the degradation of the WLAN link.

11. The method of claim 1, wherein indicating the new TTP value to the peripheral device includes:
pausing transmission of the audio data for a period of time responsive to detecting the degradation of the WLAN link; and
transmitting one or more additional Bluetooth-encoded audio frames to the peripheral device over the WLAN link after expiration of the period of time, at least one of the additional Bluetooth-encoded audio frames carrying the new TTP value.

12. The method of claim 1, wherein indicating the new TTP value to the peripheral device includes:
sending a Bluetooth protocol message to the peripheral device over a Bluetooth connection responsive to the detected degradation of the WLAN link, the Bluetooth protocol message carrying the new TTP value for the audio data.

13. The method of claim 1, wherein the WLAN link includes one or more wireless channels in a sub-GHz frequency band, a 2.4 GHz frequency band, a 5 GHz frequency band, or a 6 GHz frequency band.

14. The method of claim 1, wherein the peripheral device includes a first earbud and a second earbud, each of the first earbud and the second earbud being associated with the softAP, and each of the first earbud and the second earbud being paired with the softAP via a Bluetooth connection.

15. A wireless device, comprising:
one or more processors; and
a memory coupled to the one or more processors and storing processor-readable code that, when executed by the one or more processors, is configured to:
operate the wireless device as a wireless station (STA) associated with a wireless local area network (WLAN) while also operating as a software-enabled access point (softAP) paired with a peripheral device based on a Bluetooth protocol, the peripheral device associated with the softAP via a WLAN link;
transmitting one or more first Bluetooth-encoded audio frames to the peripheral device over the WLAN link during a first target wake time (TWT) session on the WLAN link, the one or more first Bluetooth-encoded audio frames indicating a current time-to-play (TTP) value for audio data, the current TTP value indicating a first instance in time at which the audio data is to be played;
detect a degradation of the WLAN link;
obtain one or more new TWT parameters and a new TTP value responsive to detecting the degradation of the WLAN link, the new TTP value being greater than the current TTP value, and the new TTP value indicating a second instance in time at which the audio data is to be played;
indicate the one or more new TWT parameters and the new TTP value to the peripheral device in conjunction with tearing down the first TWT session; and
establish a second TWT session on the WLAN link with the peripheral device based at least in part on the one or more new TWT parameters.

16. The wireless device of claim 15, wherein execution of the processor-readable code is further configured to:
transmit one or more second Bluetooth-encoded audio frames to the peripheral device over the WLAN link during the second TWT session, the one or more second Bluetooth-encoded audio frames carrying the new TTP value.

17. The wireless device of claim 16, wherein the new TTP value is based at least in part on a size of a buffer associated with buffering the one or more second Bluetooth-encoded audio frames in the peripheral device.

18. The wireless device of claim 15, wherein a time period between the first instance in time indicated by the current TTP value and the second instance in time indicated by the new TTP value is based at least in part on a duration of time associated with establishing the second TWT session.

19. The wireless device of claim 18, wherein the time period is approximately 250 milliseconds.

20. The wireless device of claim 15, wherein execution of the processor-readable code to indicate the new TWT parameters is configured to:
send a Bluetooth protocol message to the peripheral device over a Bluetooth connection established between the wireless device and the peripheral device, the Bluetooth protocol message carrying the one or more new TWT parameters to the peripheral device.

21. The wireless device of claim 15, wherein the one or more new TWT parameters include at least one of a TWT wake duration, a TWT wake interval, a TWT wake time, a minimum data rate, a mean data rate, a delay bound, or a user priority (UP) for the TWT session.

22. The wireless device of claim 15, wherein execution of the processor-readable code to obtain the one or more new TWT parameters is configured to:
update one or more TWT parameters associated with the first TWT session based on the detected degradation of the WLAN link.

23. The wireless device of claim 15, wherein the detected degradation includes one or more of a degradation of channel conditions on the WLAN link, a decrease in a channel quality indicator (QCI) of the WLAN link, a decrease in a modulation and coding scheme (MCS) associated with transmitting Bluetooth-encoded audio frames over the WLAN link, an increase in a packet error rate (PER) associated with the WLAN link, an increase in latencies associated with transmission of the Bluetooth-encoded audio frames over the WLAN link, or an increase in a number of retransmission attempts of one or more Bluetooth-encoded audio frames over the WLAN link.

24. The wireless device of claim 15, wherein execution of the processor-readable code to indicate the new TTP value is configured to:
embed the new TTP value into at least one Bluetooth-encoded audio frame transmitted to the peripheral device over the WLAN link after detecting the degradation of the WLAN link.

25. The wireless device of claim 15, wherein execution of the processor-readable code to indicate the new TTP value is configured to:
pause transmission of the audio data for a period of time responsive to detecting the degradation of the WLAN link; and
transmit one or more additional Bluetooth-encoded audio frames to the peripheral device over the WLAN link after expiration of the period of time, at least one of the additional Bluetooth-encoded audio frames carrying the new TTP value.

26. The wireless device of claim 15, wherein execution of the processor-readable code to indicate the new TTP value is configured to:
send a Bluetooth protocol message to the peripheral device over a Bluetooth connection responsive to the detected degradation of the WLAN link, the Bluetooth protocol message carrying the new TTP value for the audio data.

27. The wireless device of claim 15, wherein the WLAN link includes one or more wireless channels in a sub-GHz frequency band, a 2.4 GHz frequency band, a 5 GHz frequency band, or a 6 GHz frequency band.

28. The wireless device of claim 15, wherein the peripheral device includes a first earbud and a second earbud, each of the first earbud and the second earbud being associated with the softAP, and each of the first earbud and the second earbud being paired with the softAP via a Bluetooth connection.

29. A wireless device, comprising:
means for operating the wireless device as a wireless station (STA) associated with a wireless local area network (WLAN) while also operating as a software-enabled access point (softAP) paired with a peripheral device based on a Bluetooth protocol, the peripheral device associated with the softAP via a WLAN link;
means for transmitting one or more first Bluetooth-encoded audio frames to the peripheral device over the WLAN link during a first target wake time (TWT) session on the WLAN link, the one or more first Bluetooth-encoded audio frames indicating a current time-to-play (TTP) value for audio data, the current TTP value indicating a first instance in time at which the audio data is to be played;
means for detecting a degradation of the WLAN link;
means for obtaining one or more new TWT parameters and a new TTP value responsive to detecting the degradation of the WLAN link, the new TTP value being greater than the current TTP value, and the new TTP value indicating a second instance in time at which the audio data is to be played;
means for indicating the one or more new TWT parameters and the new TTP value to the peripheral device in conjunction with tearing down the first TWT session; and
means for establishing a second TWT session on the WLAN link with the peripheral device based at least in part on the one or more new TWT parameters.

30. A non-transitory computer-readable storage medium storing processor-readable code that, when executed by one or more processors of a wireless device, causes the wireless device to perform operations including:
operating the wireless device as a wireless station (STA) associated with a wireless local area network (WLAN) while also operating as a software-enabled access point (softAP) paired with a peripheral device based on a Bluetooth protocol, the peripheral device associated with the softAP via a WLAN link;
transmitting one or more first Bluetooth-encoded audio frames to the peripheral device over the WLAN link during a first target wake time (TWT) session on the WLAN link, the one or more first Bluetooth-encoded audio frames indicating a current time-to-play (TTP) value for audio data, the current TTP value indicating a first instance in time at which the audio data is to be played;
detecting a degradation of the WLAN link;
obtaining one or more new TWT parameters and a new TTP value responsive to detecting the degradation of the WLAN link, the new TTP value being greater than the current TTP value, and the new TTP value indicating a second instance in time at which the audio data is to be played;
indicating the one or more new TWT parameters and the new TTP value to the peripheral device in conjunction with tearing down the first TWT session; and
establishing a second TWT session on the WLAN link with the peripheral device based at least in part on the one or more new TWT parameters.

* * * * *